(12) United States Patent
Nomura

(10) Patent No.: US 9,992,374 B2
(45) Date of Patent: Jun. 5, 2018

(54) IMAGE PROCESSING APPARATUS AND IMAGE PROCESSING METHOD

(71) Applicant: Konica Minolta, Inc., Chiyoda-ku, Tokyo (JP)

(72) Inventor: Shoichi Nomura, Machida (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/290,365

(22) Filed: Oct. 11, 2016

(65) Prior Publication Data

US 2017/0104887 A1    Apr. 13, 2017

(30) Foreign Application Priority Data

Oct. 13, 2015    (JP) .................................. 2015-202338

(51) Int. Cl.
*G06F 15/00*    (2006.01)
*H04N 1/387*    (2006.01)
*H04N 1/00*    (2006.01)

(52) U.S. Cl.
CPC ....... H04N 1/3878 (2013.01); H04N 1/00355 (2013.01)

(58) Field of Classification Search
CPC .......................... H04N 1/00355; H04N 1/3878
USPC ....................................................... 358/1.12
See application file for complete search history.

(56) References Cited

U.S. PATENT DOCUMENTS

| 6,324,377 | B2 * | 11/2001 | Ando | ................. | G03G 15/6564 |
| | | | | | 271/251 |
| 2009/0323131 | A1 * | 12/2009 | Toyoda | ................... | G06T 3/608 |
| | | | | | 358/448 |
| 2012/0194597 | A1 * | 8/2012 | Okamoto | ............... | B41J 11/663 |
| | | | | | 347/16 |
| 2015/0166293 | A1 * | 6/2015 | Hamamura | ............ | B41J 11/663 |
| | | | | | 358/1.12 |
| 2017/0104887 | A1 * | 4/2017 | Nomura | ............. | H04N 1/00355 |

FOREIGN PATENT DOCUMENTS

| JP | 2000-244728 A | 9/2000 |
| JP | 2006-082469 A | 3/2006 |

OTHER PUBLICATIONS

International Search Report (PCT/ISA/210) issued on "Date ISR issued", by the "ISA Country" Patent Office as the International Searching Authority for International Application No.
Written Opinion (PCT/ISA/237) issued on "Date WO issued", by the "ISA Country" Patent Office as the International Searching Authority for International Application No.

* cited by examiner

*Primary Examiner* — Saeid Ebrahimi Dehkord
(74) *Attorney, Agent, or Firm* — Buchanan Ingersoll & Rooney PC

(57) ABSTRACT

An image processing apparatus includes: an image processing unit configured to execute, in forming an image on both surfaces of a sheet, image processing including skew correction to deform the image in advance to offset distortion to be caused in the image to be formed on the sheet, wherein, the image processing unit receives specification of any of one side, two sides, and an external form of the sheet, as a reference position of the image processing for the image to be formed on the both surfaces of the sheet, and executes the image processing including the skew correction based on the specification.

12 Claims, 17 Drawing Sheets

IMAGE PROCESSING APPARATUS AND IMAGE PROCESSING METHOD

The entire disclosure of Japanese Patent Application No. 2015-202338 filed on Oct. 13, 2015 including description, claims, drawings, and abstract are incorporated herein by reference in its entirety.

BACKGROUND OF THE INVENTION

Field of the Invention

The present invention relates to an image processing apparatus and an image processing method, and especially relates to a technology for appropriately correcting tilt of an image in printed matter.

Description of the Related Art

In printing letters and an image (hereinafter, "image") on a sheet to generate printed matter, a technology for adjusting an image position so that the image is printed on a correct position on the sheet is known.

As the technology for adjusting an image position, there are a method for mechanically adjusting a position of the sheet or a print head, and a technique for adjusting a conveying speed of the sheet or a rotating speed of a polygon mirror to adjust a main-scanning printing speed or a sub-scanning direction density.

In recent years, in addition to the above methods, a technique for adjusting an image position or tilt by deforming image information before print in a direction of offsetting an image positional deviation or an image distortion at the time of print may be used. For example, in duplex printing, when images on front and back sides of the sheet have tilts (skews), respectively, the technique has a characteristic to easily execute front and back position adjustment by deforming the images to be tilted into opposite directions.

Note that related technologies are described in the prior art documents such as JP 2006-82469 A and JP 2000-244728 A below. Hereinafter, problems, and JP 2006-82469 A and JP 2000-244728 A will be described.

Although, in the image position adjustment with the above-described image deformation (skew correction), image position adjustment with a high degree of freedom can be performed, problems as described below exist.

[Problem 1] A correction target position cannot be appropriately set:

as an important element of the image position adjustment, there is positional deviation adjustment of the front and back sides of the sheet (front and back registering).

In a normal case, position adjustment to adjust a back surface to a front surface is executed, assuming that the front surface has been adjusted. However, in a case where the front surface has not been printed on a desired position, the print position is not favorable even if the front and back registering is adjusted.

For example, assume a case in which the sheet has distortion and the sheet is cut into pieces having a predetermined size after print. In this case, the sheet is cut using a cut trim mark that is a predetermined cut mark as a guide. As a result, printed matter with adjusted image position and sheet size can be obtained. However, if a positional relationship between the printed sheet before cutting and the cut trim mark, especially, the degree of parallelization between the trim mark used for first cut and a sheet side butting against a position adjusting tool is not correctly maintained, a lot of labor is required. Further, in a case where cut is not performed, it is favorable to adjust the sides of the sheet, rather than a specific side, to an image position where the tilt rarely occurs on the average.

The above description has been made on the assumption that an external form has distortion. However, this assumption is not limited to a case where a user who is not a professional cuts a base sheet having a large size to create a non-fixed size sheet, and is also applied to various types of fixed-size sheets, which are supplied from the professionals. Even the sheets cut in a predetermined fixed size by a special apparatus have some cut errors, and deviation of right angles at four corners often occurs. Further, uneven expansion and contraction occurs in the sheets according to a storage environment after cut, and the right angles at four corners may be deviated.

JP 2006-82469 A discloses means for setting skew for a predetermined end side portion of a sheet, to be specific, a configuration in which a user can appropriately perform adjustment while viewing an image. However, a correction target relies on an experience and a feeding of the user. Therefore, aside from an expert, a user who has a limited experience in print cannot easily realize the adjustment.

[Problem 2] A margin is required in an image print area:

the above-described technique for adjusting the image position and the tilt by deforming the image information is realized by securing a printable image area larger than a print image body, and deforming and adjusting the position of the image in the area. Note that a difference between the print image body and the printable image area is called "margin".

A maximum amount of an adjustable image position depends on the size of the margin. However, taking the large margin has harmful effects such as an increase in a cost of an image forming apparatus, an increase in a size of the entire apparatus, and a decrease in print productivity. Therefore, there are limitations to making the margin large.

JP 2000-244728 A above relates to document tilt correction processing at the time of reading an image. While uses and targets are different between print in the present application and readout in JP 2000-244728 A, the margin is required in the image deformation processing, and the same problem is shared in terms of the limitations to the size of the margin. Here, JP 2000-244728 A discloses a technique for displaying warning or modifying correction when the tilt of the document is tilted larger than a maximum correction angle. However, no measurements for effectively using the limited margin have been proposed.

[Problem 3] Skew correction may deteriorate image quality:

the image position adjustment by image deformation is associated with the processing for deforming a print image, image quality deterioration may be visually recognized. To eliminate the image quality deterioration, preparation of a switch not to execute skew position adjustment can be considered. In that case, if only a skew correction amount is not simply executed, the image position may be deviated to an unintended direction with respect to the sheet. Therefore, there is a problem that the image position adjustment needs to be performed again, or adjustment of execution and non-execution of the skew position adjustment needs to be performed in advance, and this requires labor.

SUMMARY OF THE INVENTION

The present invention has been made in view of such problems, and an object of the present invention is to realize an image processing apparatus and an image processing method that can appropriately set and adjust a correction target in performing skew correction, corresponding to various types of distortion occurring in image formation.

That is, to solve the above-described problems, an image processing apparatus or an image processing method that reflects one aspect of the present invention is described below.

(1) To achieve the abovementioned object, according to an aspect, an image processing apparatus reflecting one aspect of the present invention comprises: an image processing unit configured to execute, in forming an image on both surfaces of a sheet, image processing including skew correction to deform the image in advance to offset distortion to be caused in the image to be formed on the sheet, wherein, the image processing unit receives specification of any of one side, two sides, and an external form of the sheet, as a reference position of the image processing for the image to be formed on the both surfaces of the sheet, and executes the image processing including the skew correction based on the specification.

(2) According to Item. 1, the image processing unit preferably executes the image processing to generate a mark capable of identifying existence or non-existence of the specification.

(3) According to Item. 1, in a case where the specification is the one side or the two sides of the sheet, the image processing unit preferably executes the image processing to generate, on predetermined one of a cut position facing the specification or a cut position of the specification, a mark capable of identifying the existence or non-existence of the specification and the cut position.

(4) According to Item. 1, in a case where the specification is the two sides of the sheet, and first specification and second specification exist in priority order as the reference position, the image processing unit preferably executes the image processing to generate, on predetermined one of a position facing the first specification or a cut position of the first specification, a mark capable of identifying a first cut position corresponding to the first specification, and executes the image processing to generate, on predetermined one of a position facing the second specification or a cut position of the second specification, a mark capable of identifying a second cut position corresponding to the second specification.

(5) According to Item. 1, in a case where the specification is the external form, the image processing unit preferably approximates the external form to a square, and executes the skew correction for a first surface of the sheet in accordance with the square.

(6) To achieve the abovementioned object, according to an aspect, an image processing apparatus reflecting one aspect of the present invention comprises: an image processing unit configured to execute, in forming an image on both surfaces of a sheet, image processing including skew correction to deform the image in advance to offset distortion to be caused in the image to be formed on the sheet, wherein, in a case where execution and non-execution of the skew correction are selectable, and the non-execution of the skew correction is selected, the image processing unit does not execute the skew correction for a first image to be formed on a first surface of the sheet and a second image to be formed on a second surface of the sheet, and the image processing unit executes the image processing to execute the skew correction for a mark indicating a cut position to include the first image and the second image.

(7) To achieve the abovementioned object, according to an aspect, an image processing apparatus reflecting one aspect of the present invention comprises: an image processing unit configured to execute, in forming an image on both surfaces of a sheet, image processing including skew correction to deform the image in advance to offset distortion to be caused in the image to be formed on the sheet, wherein, in a case where execution and non-execution of the skew correction are selectable, and the non-execution of the skew correction is selected, the image processing unit does not execute the skew correction for a first image to be formed on a first surface of the sheet and a second image to be formed on a second surface of the sheet, and the image processing unit executes the image processing to perform position adjustment for at least one of the first image and the second image such that a fulcrum position of the first image and a fulcrum position of the second image become equal.

(8) According to Item. 7, the image processing unit preferably executes, for tilt to be corrected by the skew correction among types of the distortion, the image processing by the position adjustment not to provide an influence on a positional deviation to be corrected by correction other than the skew correction among types of the distortion.

(9) According to Item. 7, the image processing unit preferably executes the position adjustment at a time of non-execution of the skew correction such that a fulcrum position in the skew correction at a time of execution of the skew correction is maintained.

(10) To achieve the abovementioned object, according to an aspect, there is provided a non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, reflecting one aspect of the present invention, the program for receiving specification of any of one side, two sides, and an external form of the sheet, as a reference position of the image processing for the image to be formed on the both surfaces of the sheet, and executing the image processing including the skew correction based on the specification.

(11) To achieve the abovementioned object, according to an aspect, there is provided a non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, reflecting one aspect of the present invention, in a case where execution and non-execution of the skew correction are selectable, and the non-execution of the skew correction is selected, the program for not executing the skew correction for a first image to be formed on a first surface of the sheet and a second image to be formed on a second surface of the sheet, and executing the image processing to execute the skew correction for a mark indicating a cut position to include the first image and the second image.

(12) To achieve the abovementioned object, according to an aspect, there is provided a non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, reflecting one aspect of the present invention, in a case where execution and non-execution of the skew correction are selectable, and the non-execution of the skew correction is selected, the program for not executing the skew correction for a first image to be formed on a first surface of the sheet and a second image to be formed on a second surface of the sheet, and executing the image processing to perform position adjustment for at least one of the first image and the second image such that a fulcrum position of the first image and a fulcrum position of the second image become equal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of an image processing apparatus and an image processing method that can execute appropriate skew correction corresponding to various types of distortion occurring in image formation will be described in detail with reference to the drawings. However, the scope of the invention is not limited to the illustrated examples.

[Configuration of Image Processing Apparatus]

Figure 1:
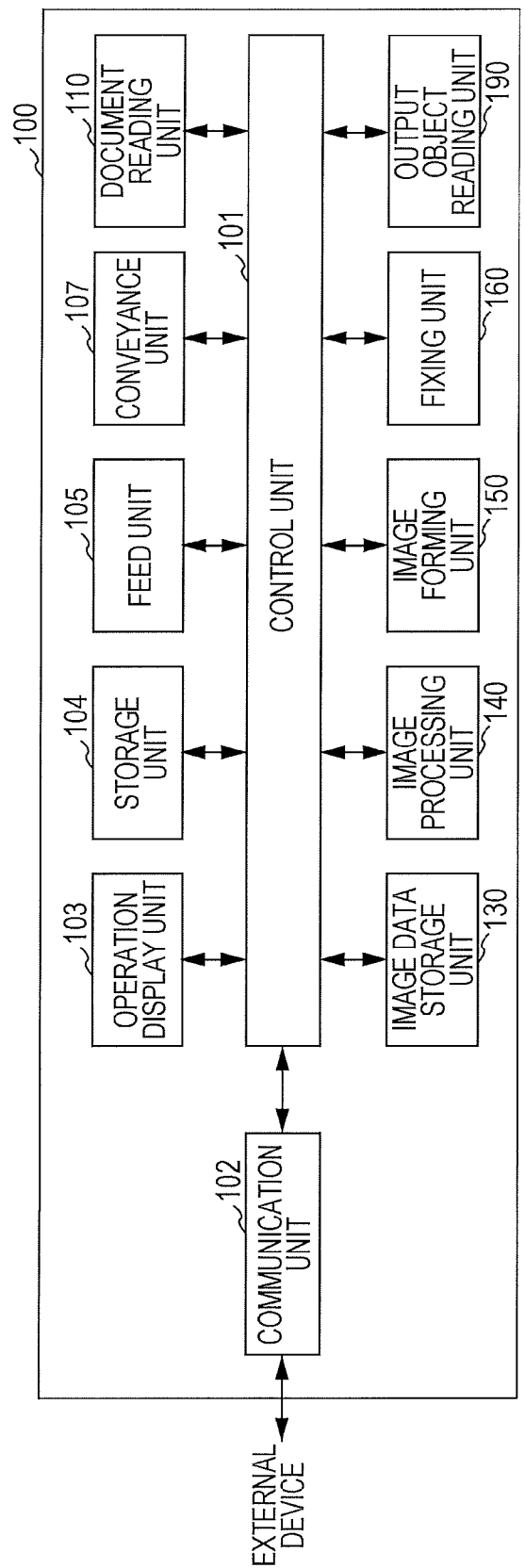
FIG. 1 is a configuration diagram illustrating a configuration of an embodiment of the present invention.

A first configuration example of an image forming apparatus will be described in detail based on FIGS. 1 and 2. Note that FIG. 1 is a function block diagram illustrating functions of respective units, and FIG. 2 is an explanatory diagram illustrating mechanical configuration elements of respective units.

Here, an image forming apparatus 100 includes a control unit 101 that controls respective units in the image forming apparatus 100, a communication unit 102 for performing communication with another connected apparatus, an operation display unit 103 that allows operation inputs by a user and performs state display of the image forming apparatus 100, a storage unit 104 that stores various types of setting, a feed unit 105 that can feed sheets accommodated in a feed tray, a conveyance unit 107 that conveys the sheet in the apparatus, a document reading unit 110 that reads a document, an image data storage unit 130 that stores image data and various data in forming an image, an image processing unit 140 that executes various types of image processing necessary for image formation, an image forming unit 150 that forms the image on the sheet based on an image forming command and the image data, a fixing unit 160 that stabilizes the image formed on the sheet with a toner by heat and pressure, and an output object reading unit 190 that reads the image formed on the sheet.

Figure 2:
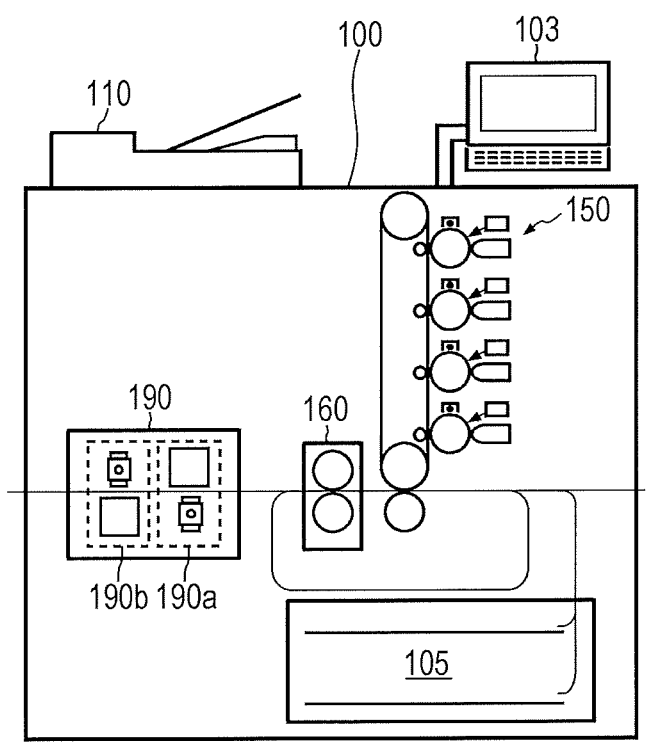
FIG. 2 is a configuration diagram illustrating a configuration of an embodiment of the present invention.

As illustrated in FIG. 2, the image forming unit 150 is a so-called electrophotographic image forming unit that develops an electrostatic latent image formed on a charged image carrier into a toner image, layers toner images of respective colors on an intermediate transfer body, and then transfers the toner images on the sheet. Note that the specific configuration of the image forming unit 150 is not limited to the example illustrated in FIG. 2.

The output object reading unit 190 reads the image formed on the sheet, and is arranged on a downstream side of the image forming unit 150 and the fixing unit 160. The output object reading unit 190 has a configuration to read the image during conveyance of the sheet. Note that the output object reading unit 190 may be arranged in an intermediate processing apparatus or a post-processing apparatus at a subsequent stage of the image forming apparatus 100. Further, the output object reading unit 190 includes an output object reading unit 190a that reads the image on one surface of the sheet, and an output object reading unit 190b that reads the image on the other surface of the sheet.

A portion of the image forming apparatus 100, from which the image forming unit 150 and the fixing unit 160 are excluded, may be employed as the image processing apparatus.

Figure 3:
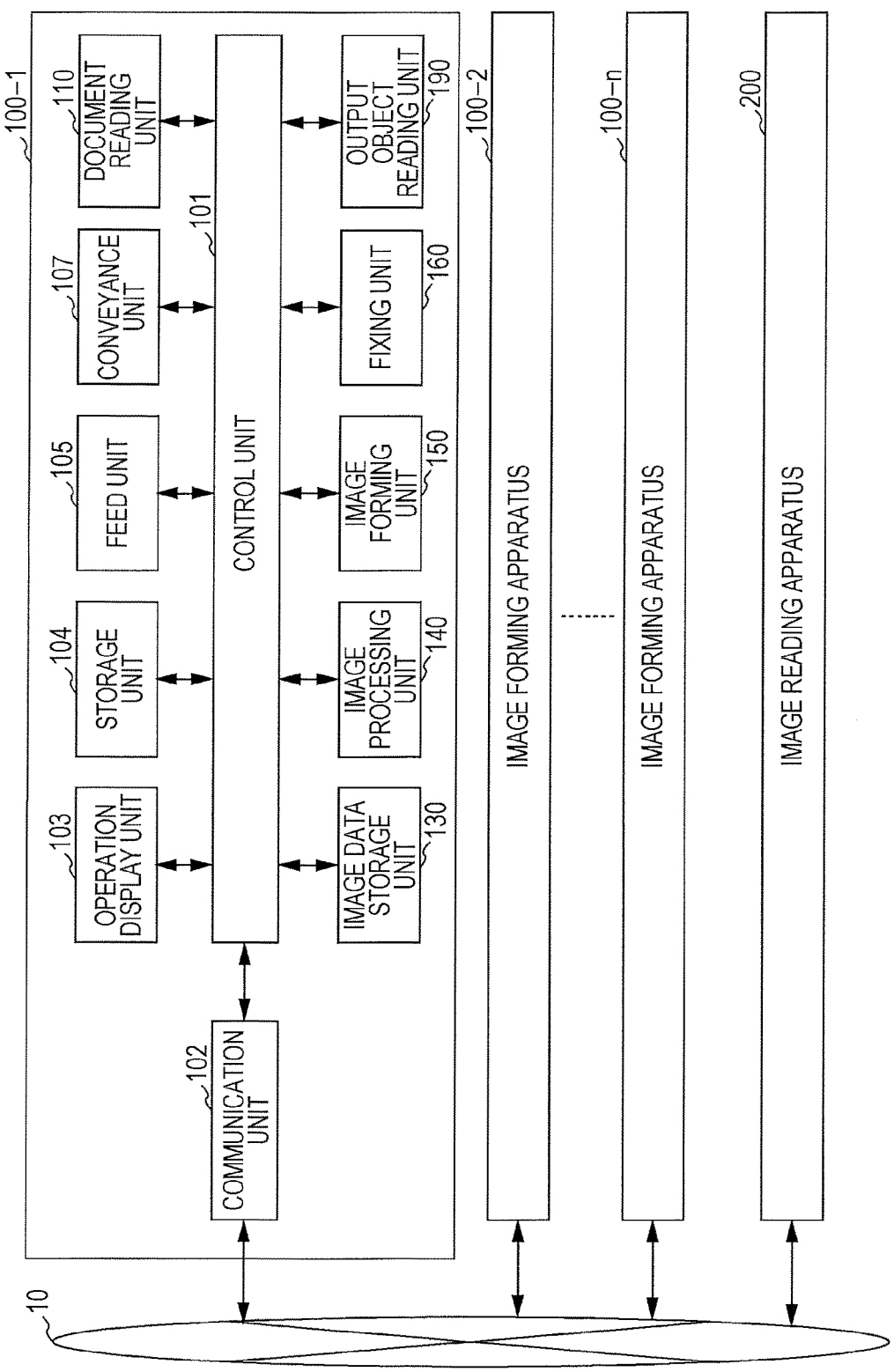
FIG. 3 is a configuration diagram illustrating another configuration of an embodiment of the present invention.

FIG. 3 illustrates a second configuration example of the image forming apparatus. Here, a total of n image forming apparatuses including an image forming apparatus 100-1 to an image forming apparatus 100-n are connected to a network 10. Further, an image reading apparatus 200 is connected to the network 10. In this case, a scan result of the image reading apparatus 200 is supplied to the image forming apparatuses 100-1 to 100-n through the network 10.

Figure 4:
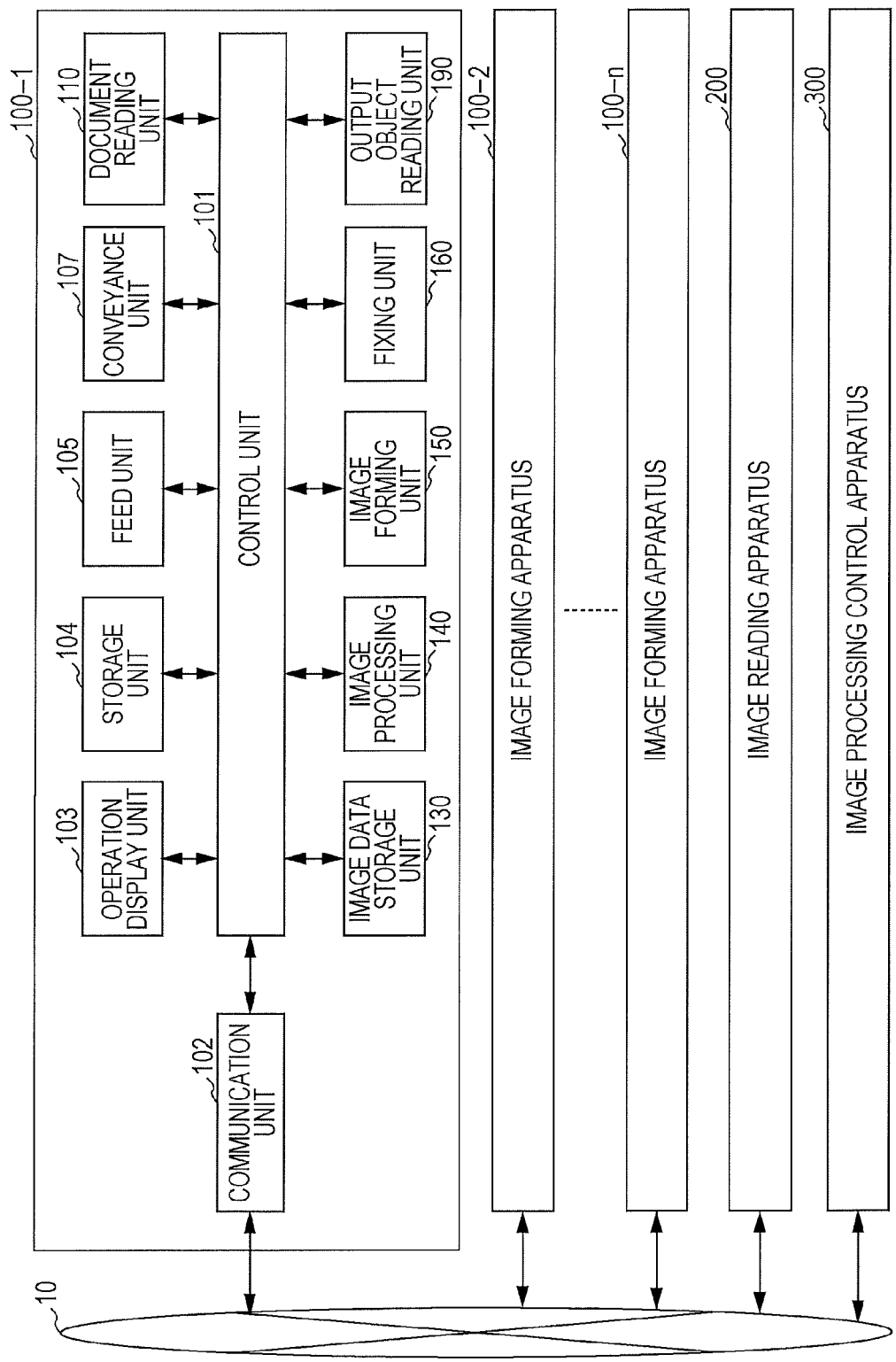
FIG. 4 is a configuration diagram illustrating another configuration of an embodiment of the present invention.

FIG. 4 illustrates a third configuration example of the image forming apparatus. Here, a total of n image forming apparatuses including the image forming apparatus 100-1 to the image forming apparatus 100-n are connected to the network 10. Further, the image reading apparatus 200 and an image processing control apparatus 300 are connected to the network 10. In this case, an image processing parameter calculated in the image processing control apparatus 300 according to the scan result of the image reading apparatus 200 is supplied from the image processing control apparatus 300 to the image forming apparatuses 100-1 to 100-$n$ through the network 10.

[Principle (1) of Image Processing]

Figure 5:
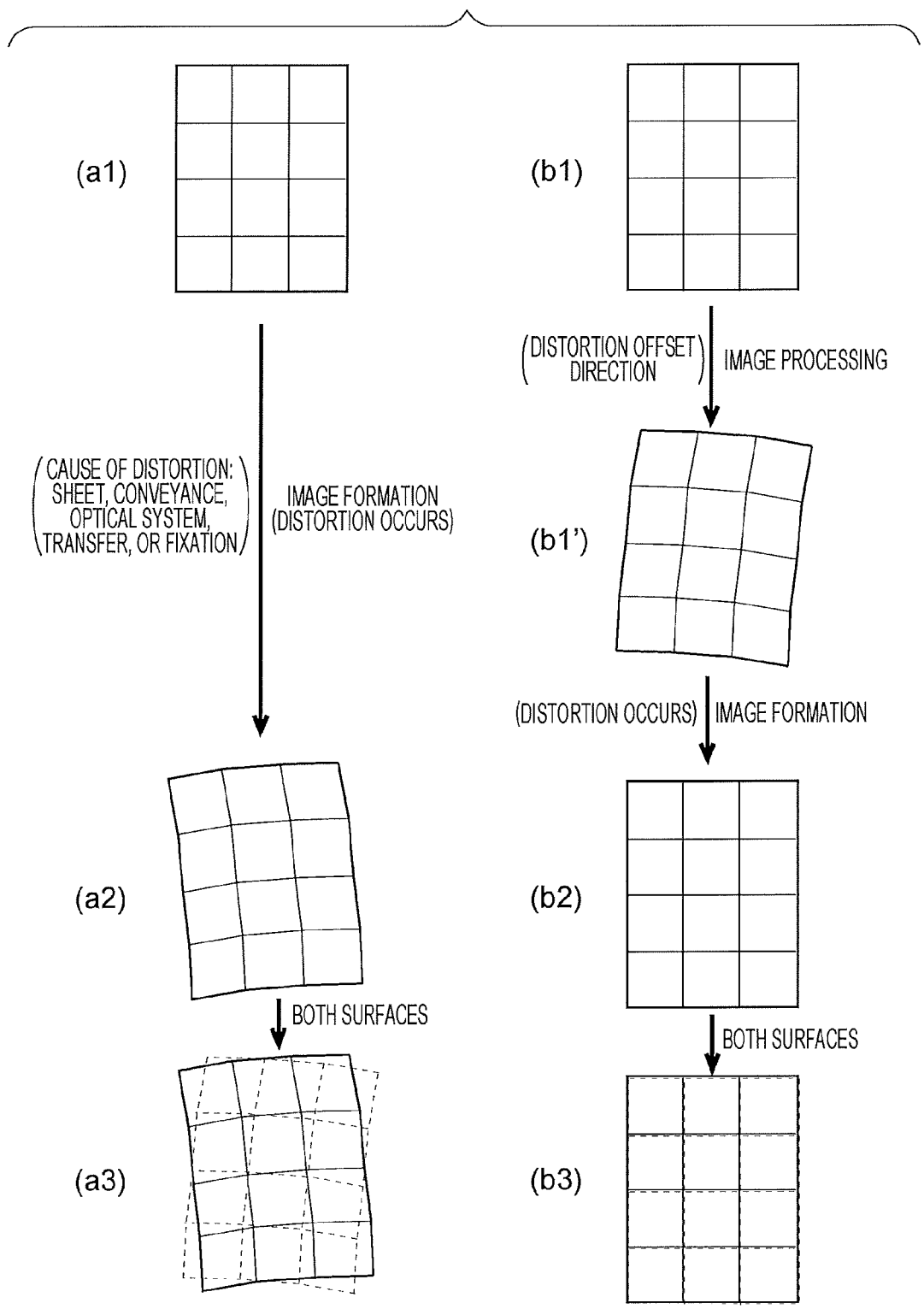
FIG. 5 is an explanatory diagram illustrating states of printed matter of an embodiment of the present invention.

(a1) of FIG. 5 illustrates an image obtained when the image is formed based on the image data without distortion. Here, in the image forming apparatus 100, distortion occurs on the grounds of a sheet shape, a sheet conveyance characteristic, an optical system characteristic at the time of forming the image, an image transfer characteristic from the image carrier of the image forming unit 150 to the sheet, an image fixation characteristic on the sheet, and the like. As a result, the image having distortion, as illustrated in (a2) of FIG. 5, is formed. Here, as the distortion, a state in which tilt (skew) occurs is illustrated. Further, when the image having such distortion is formed on both surfaces of the sheet, the image on the front surface of the sheet is illustrated by a solid line, and the image on the back surface of the sheet is illustrated by a broken line, in (a3) of FIG. 5. That is, when seeing the image on the front surface of the sheet and the image on the back surface of the sheet through the sheet, distortion is included in an opposite direction.

Note that FIG. 5 schematically illustrates states in which the sheet is conveyed in an up and down direction on the sheet surface of the drawing, and first, the image on the back surface is printed, then the front and back is switched in a flip vertical direction, then the image is printed on the front surface by the same print apparatus. This front and back relationship is changed according to a print method, such as a method for executing front and back print, for example, a method for switching upper and lower sides of the sheet in the flip vertical direction, or using two front and back print apparatuses. However, effects of the present invention remain.

Figure 6A:
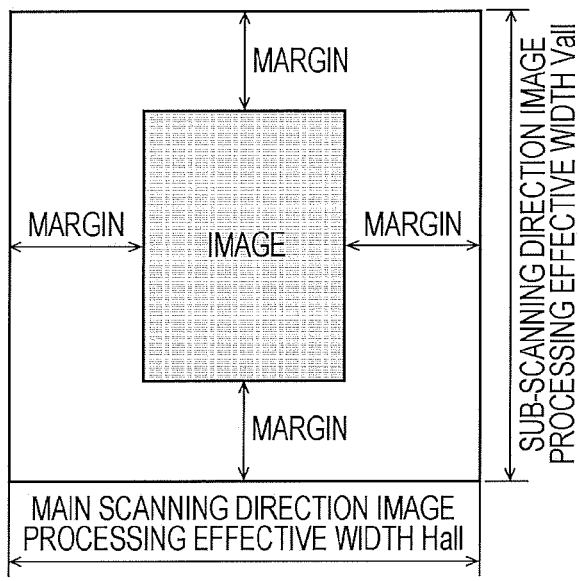
FIGS. 6A to 6C are explanatory diagrams illustrating states of image processing of an embodiment of the present invention.

Further, FIG. 5 illustrates complicated states of a non-linear distortion, as illustrated in (a2) and (b1') of FIG. 5, as description of the distortion, and illustrates distortion amount itself in an exaggerated manner. However, in an actual printer, such a large distortion illustrated in the drawing does not occur, and a component of the non-linear distortion is sufficiently smaller than the size of the tilt, and is thus rarely targeted for correction of the image position adjustment. Therefore, FIGS. 6A to 6C and the subsequent explanatory diagrams illustrate only various types of tilt components.

Further, although not described here, a positional deviation of the image may occur due to the distortion. Then, even in this positional deviation of the image, the positional deviation is included in an opposite direction, depending on a combination of the front and back print methods described above, when seeing the image on the front surface of the sheet and the image on the back surface of the sheet through the sheet.

(b1) of FIG. 5 illustrates the image obtained when the image is formed without distortion based on the image data. Here, in the image forming apparatus 100, the distortion occurs on the grounds of a sheet shape, a sheet conveyance characteristic, an optical system characteristic at the time of forming the image, an image transfer characteristic from the image carrier of the image forming unit 150 to the sheet, an image fixation characteristic on the sheet, and the like, as illustrated in (a2) of FIG. 5. Therefore, the image is deformed so that the angle and the direction come to an opposite side to (a2) of FIG. 5, at the stage of the image data that is to be formed into an image ((b1') of FIG. 5). As a result, the distortion occurring in the image formation is offset, and an original image without the distortion is formed, as illustrated in (b2) of FIG. 5. When the image without the distortion is formed on the both surfaces of the sheet, the image on the front surface of the sheet is illustrated by the solid line, and the image on the back surface of the sheet is illustrated by the broken line, in (b3) of FIG. 5. That is, when seeing the image on the front surface of the sheet and the image on the back surface of the sheet through the sheet, the images accord with each other.

Further, although not described here, when the positional deviation of the image occurs due to the distortion, the position can be corrected to the opposite direction to the occurring positional deviation, at the stage of the image data.

[Principle (2) of Image Processing]

An image work space (a main scanning direction image processing effective width Hall×a sub-scanning direction image processing effective width Vall) larger than the image to be drawn (the "image" in FIG. 6A) is prepared in advance in an image memory of the image processing unit 140, and the correction of the tilt and position is performed in the image work space.

Figure 6B:
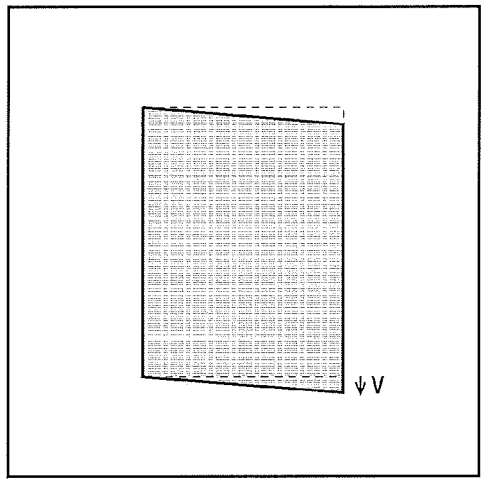
Figure 6C:
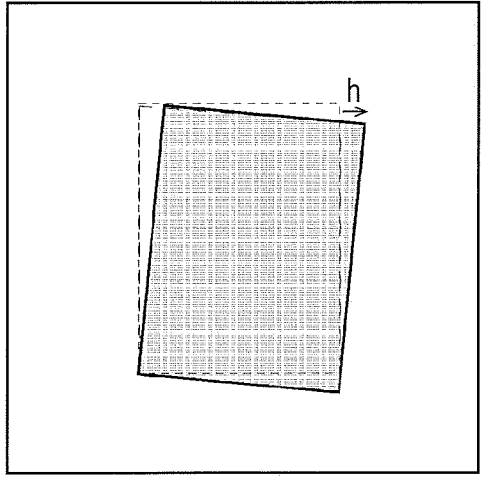

Here, in a case of tilting the image, pixel shift in a sub-scanning direction V, as illustrated in FIG. 6B, and pixel shift in a main scanning direction h, as illustrated in FIG. 6C are sequentially executed. As described above, the main and sub image skew deformation functions are respectively controlled, so that image deformation processing corresponding to image rotation becomes available, for example, and a load at the time of the image processing in the image processing unit 140 can be decreased. Note that the pixel shift in the main scanning direction h, as illustrated in FIG. 6C, and the pixel shift in the sub-scanning direction v, as illustrated in FIG. 6B, can be processed in that order. Alternatively, two components can be processed in one step, instead of such two steps.

Further, in a case where the adjustment amount of one of the main scanning direction and the sub-scanning direction is extremely small, as described above, an effect of the image position adjustment by the adjustment is small. However, the fact remains that the image deformation processing is executed, and the image quality deterioration due to the processing may occur. Therefore, it may be configured to select "execution/non-execution" of such fine position adjustment, and in a case of the non-execution, a component corresponding to the fine position adjustment or a corresponding step is not executed, and the image quality deterioration may be avoided.

[Margin in Image Processing]

To execute the image deformation processing in correcting the tilt or position of the image, as described above, an additional area (margin) where the image is deformed or moved is required in a vicinity of the image and in the image work space. Note that the margin is required both on the image memory where the deformation processing for the image is performed and on the image carrier where the image is formed by exposure.

Figure 7:
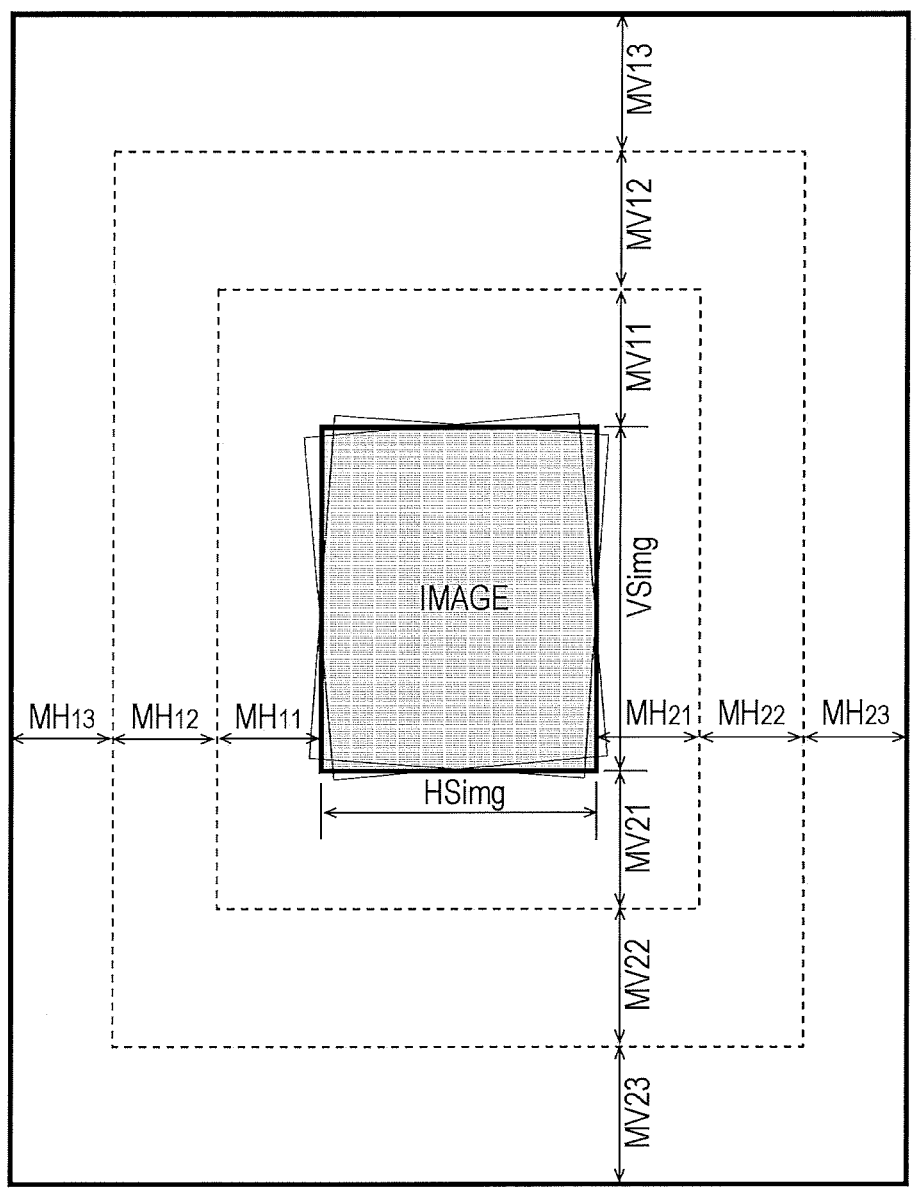
FIG. 7 is an explanatory diagram illustrating a state of image processing of an embodiment of the present invention.

Then, the margin can be divided into a skew correction margin (the main scanning direction: MH11 and MH21, the sub-scanning direction: MV11 and MV21), a magnification correction margin (the main scanning direction: MH12 and MH22, the sub-scanning direction: MV12 and MV22), and a position correction margin (the main scanning direction: MH13 and MH23, and the sub-scanning direction: MV13 and MV23) (see FIG. 7).

Considering combinations of various types of adjustment amounts, a maximum value of necessary margin amounts is an addition, or is statistically the square root of the square sum if the respective adjustment amounts are independent of each other and change (variation of each individual or each number of times of execution) of each of the adjustment amounts effectively follows normal distribution, and becomes large. Further, to secure a sufficient margin, in a case of the sub-scanning direction, for example, an interval between sheets in a sheet conveying direction at the time of continuous print needs to increase, that is, the number of printed sheets per unit time needs to be suppressed. Further, in a case of the main scanning direction, all of main scanning corresponding widths of an fθ lens, a photosensitive drum, a fixing apparatus, and the like used for print need to be made large, and has a significant impact on apparatus performance and print cost.

If these margins are not sufficient, sufficient correction cannot be performed, and image vignetting and poor print grade may occur.

Note that importance (priority) of correction amounts may be changed depending on use of the user or an occurrence state of the distortion. Further, in a case of an output to a fixed-size sheet, the output itself is the final use form, and thus the image needs to be printed on a prescribed position on the sheet. Further, in a case of an output of an elongated sheet with trim marks (cut marks), cut is supposed and thus printing that can be easily cut (printing parallel to a sheet side) is required.

Therefore, in the present embodiment, a function to set priority in various types of correction such as the skew correction of the tilt and the position correction of the positional deviation is provided. Then, a function to preferentially use the margin for the correction having high priority, and to decrease a use amount of the margin for the other correction and limit the correction amount is provided. Note that these functions will be described in detail below.

[Examples of Images and Charts Formed on Sheet]

Figure 8A:
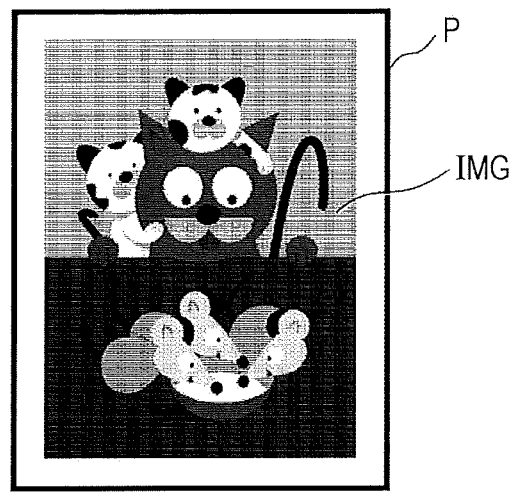
FIGS. 8A to 8C are explanatory diagrams illustrating states of printed matter of an embodiment of the present invention.
Figure 8B:
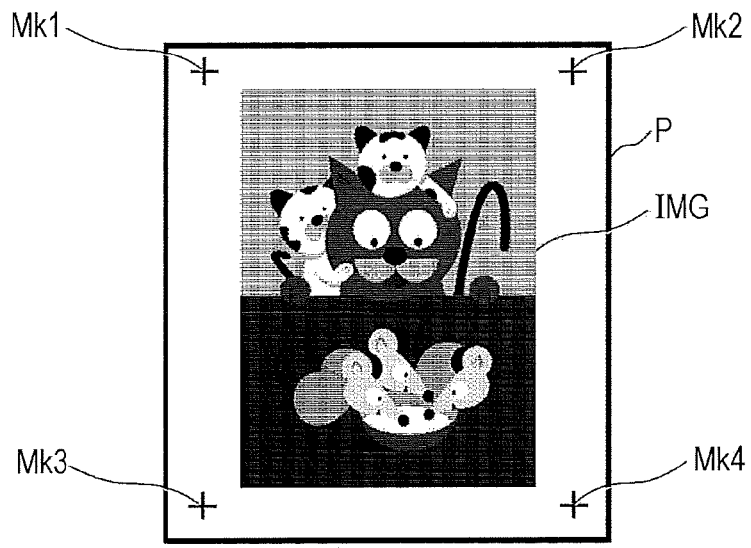
Figure 8C:
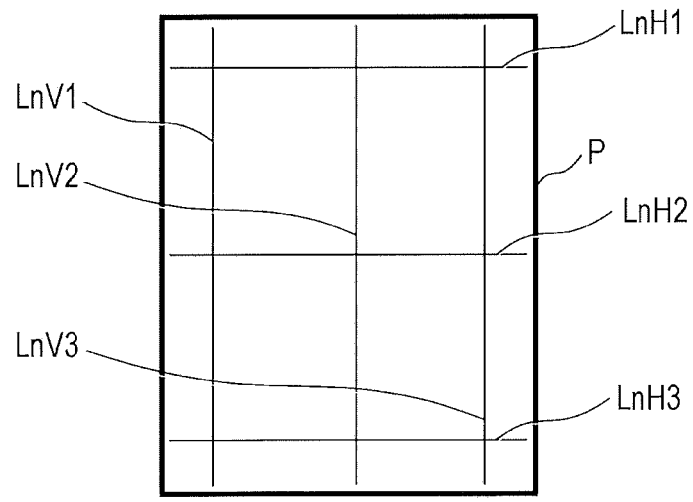

Hereinafter, output forms of printed matter will be described with reference to FIGS. 8A to 8C. FIG. 8A illustrates a state in which an image IMG is printed on the entire sheet P, and the sheet P is used as it is. FIG. 8B illustrates a state in which trim marks Mk1 to Mk4 as cut marks are provided to peripheral portions of the sheet P, and the image IMG is printed inside the trim marks Mk1 to Mk4. As a post-processing, cut of the sheet is executed at positions of the trim marks Mk1 to Mk4 after print. As the trim marks Mk1 to Mk4 as the cut marks, not only the cross shape, but also various shapes can be used. FIG. 8C illustrates a state in which measurement reference lines LnH1 to LnH3 in the main scanning direction and measurement reference lines LnV1 to LnV3 in the sub-scanning direction are printed on the entire sheet P, and are output as a chart. This chart is read by the document reading unit 110, the output object reading unit 190, or the image reading apparatus 200, and the distortion of the image to be printed is detected from the read result. The measurement reference line is not limited to the specific example illustrated here, and various forms are employable.

As for the chart, the user can visually measure the chart and input the measurement result (numerical value) to the operation display unit 103, in addition to reading the chart by the document reading unit 110 or the like. This chart will be described in detail below.

[Operation of Image Processing]

Hereinafter, an operation of the image processing in the image forming apparatus 100 in the present embodiment will be described in detail with reference to the flowchart of FIG. 9.

Figure 9:
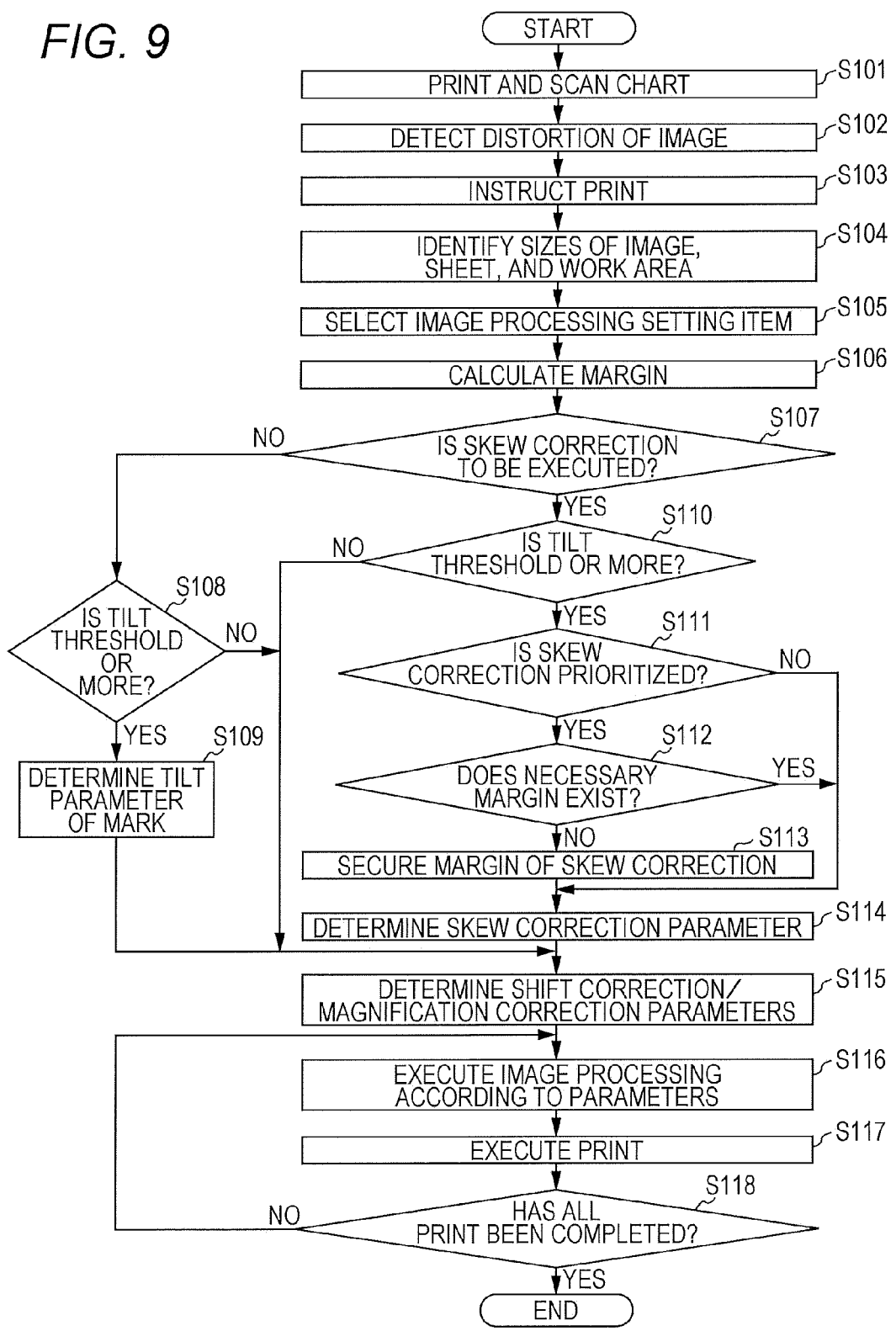
FIG. 9 is a flowchart illustrating an operation of an embodiment of the present invention.

The image forming apparatus 100 prints the chart (see FIG. 8C) on the sheet by an instruction of the control unit 101, and the output object reading unit 190 or the document reading unit 110 reads the chart printed on the sheet (step S101 in FIG. 9). In a case of reading the chart by the output object reading unit 190, the read is automatically executed together with the print by an instruction of the control unit 101.

In a case of reading the chart by the document reading unit 110, an operator executes the read based on a display of the operation display unit 103.

In this case, for example, image information of an end portion of a measurement sheet is important. Therefore, for example, it is desirable to put a background member such as a black paper on the background of the measurement sheet when placing the measurement sheet on a platen, and to read the chart such that an outline of the measurement sheet can be detected in the black background. Further, in a case where the sheet size including the black background is not fit in a maximum read size of the document reading unit 110, the measurement sheet is read a plurality of times for each part in a predetermined procedure, and the read images are composited to one large image, and the large image may be used as a read result.

The image processing unit 140 that has received an instruction of the control unit 101 compares the image data before the print and the chart read result based on the read result of the chart, and detects the distortion of the image caused in the printed matter (step S102 in FIG. 9). As illustrated in (a2) of FIG. 5, this distortion occurs on the grounds of a sheet shape, a sheet conveyance characteristic, an optical system characteristic at the time of forming an image, an image transfer characteristic from the image carrier of the image forming unit 150 to the sheet, an image fixation characteristic on the sheet, and the like.

The distortion of the image obtained here is calculated as a positional deviation amount from a reference position, for example, and a deviation amount or a value may be inverted and displayed on the operation display unit 103 as a correction amount in a user-confirmable manner. Further, the deviation amount and the correction amount may be configured to be directly editable in the operation display unit 103 so that additional correction by the user becomes available, and step S103 and subsequent processing may be executed based on the directly edited value.

Note that the print and read of the chart (step S101 of FIG. 9) and the detection of the distortion (step S102 of FIG. 9) may be executed at any time of turning ON of a power supply of the image forming apparatus 100, every fixed time, start of print, change of an environment condition, replacement of sheets in a sheet tray, and user setting.

The control unit 101 receives an instruction of the image to be printed in the image forming apparatus 100 from the operation display unit 103 or an external computer (step S103 of FIG. 9). This instruction may be associated with an input of the image data to the image forming apparatus 100, or may be a print instruction of the image data already stored in the image data storage unit 130. Note that a sheet size, a sheet type, and the number of print sheets to be printed are also instructed together with the print instruction.

The control unit 101 identifies an image size, a sheet size, and a size of a work area (the image memory of the image data storage unit 130 and the image carrier of the image forming unit 150) based on the print instruction (step S104 of FIG. 9).

Further, the control unit 101 receives an image processing setting item from the operation display unit 103 or an external computer (step S105 of FIG. 9).

Figure 10:
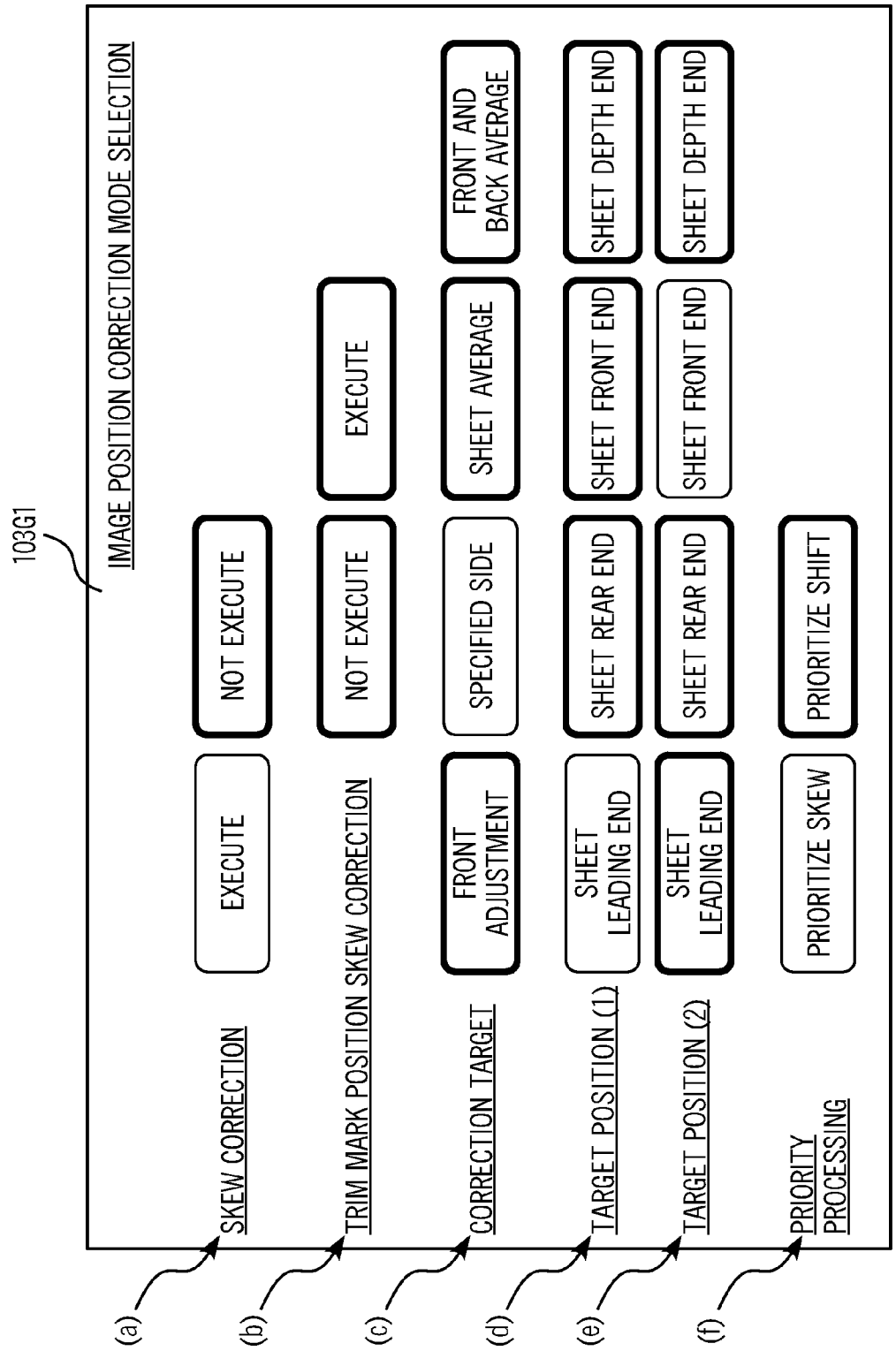
FIG. 10 is an explanatory diagram illustrating an operation state of an embodiment of the present invention.
Figure 11:
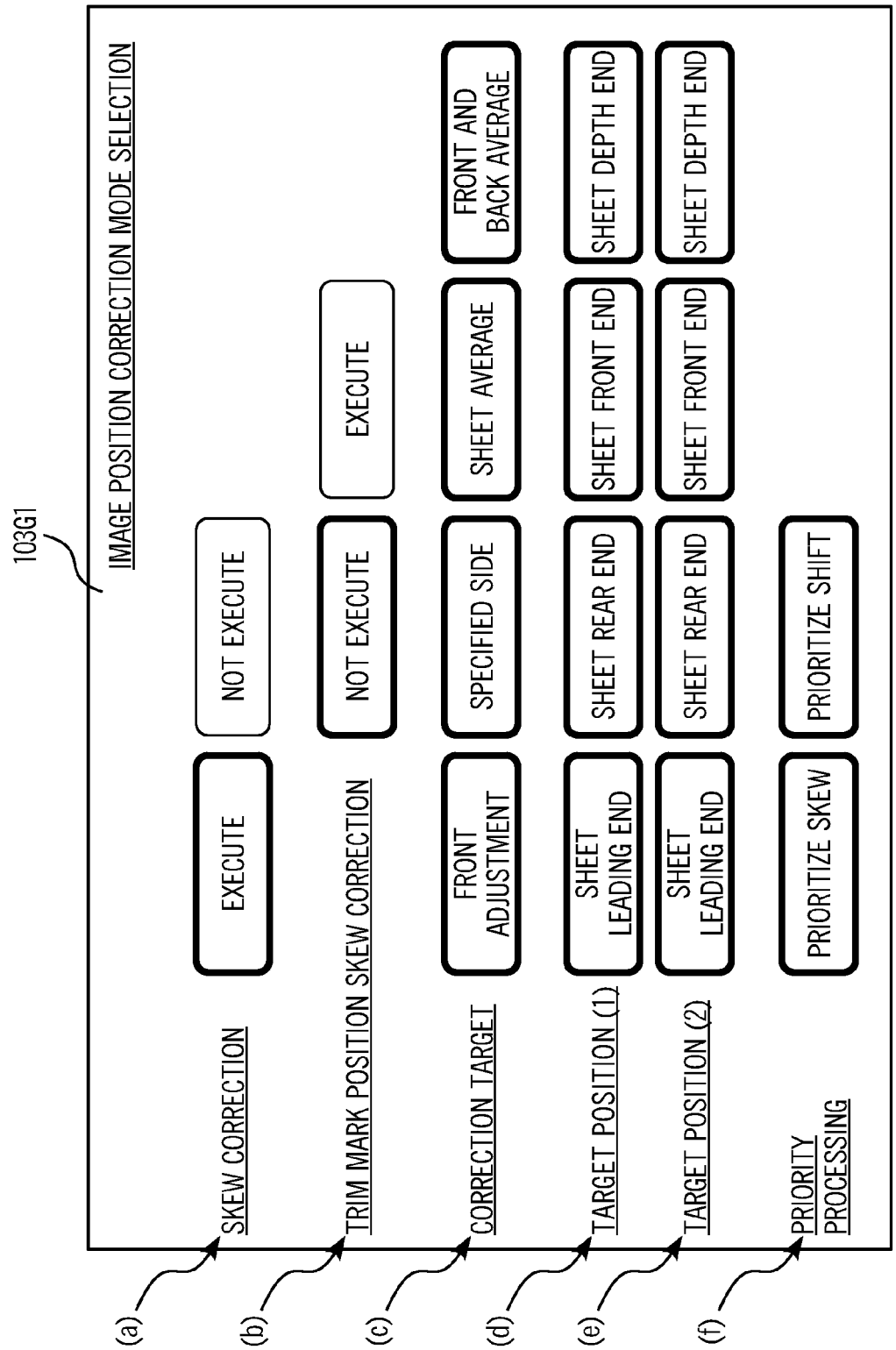
FIG. 11 is an explanatory diagram illustrating an operation state of an embodiment of the present invention.

Here, an example of an image processing setting item screen 103G1 displayed on the operation display unit 103 is described. Here, the image processing setting items and alternatives thereof are:

skew correction (execute/not execute);

trim mark position skew correction (execute/not execute);

correction target (front adjustment/specified side/sheet average/front and back average);

first target position (sheet leading end/sheet rear end/sheet front end/sheet depth end);

second target position (sheet leading end/sheet rear end/sheet front end/sheet depth end); and priority processing (prioritizing skew correction/prioritizing shift correction), as illustrated in (a) to (f) of FIG. 10 and (a) to (f) of FIG. 11.

Here, whether executing the skew correction, which correction target is to be selected when executing the skew correction, which trim mark position is to be selected when not executing the skew correction, whether prioritizing the skew correction, and the like can be set.

In FIGS. 10 and 11, a selected button is displayed in back letters on the white background, and existence or non-existence of selection is identifiable.

The selection is designed on the assumption that the selection is made in order from the top. In a case of executing the skew correction ((a) of FIG. 10), it is not necessary to select the trim mark position skew correction, and thus all of the alternatives are halftone-meshed and disabled ((b) of FIG. 10).

The example of FIG. 10 illustrates the skew correction of the image=execution, the correction target=specified side, the first target position=sheet leading end, the second target position=sheet front end, and the priority processing at the time of lack of the correction margin=skew correction.

Further, the example of FIG. 11 illustrates the skew correction of the image=non-execution and the skew correction of the trim mark position=execution. This case is a setting example for obtaining a more favorable image by preventing the image quality deterioration by not executing the skew correction for the image itself, and by correcting the skew deviation of the image by cut position adjustment without using the image deformation by tilting the trim mark positions as the cut marks around the image. Note that, in FIG. 11, selection of the priority processing is disabled together with the skew and shift. However, for example, if a possibility of lack of the margin is high, it may be configured to set either selection to be enabled, as needed.

Figure 12:
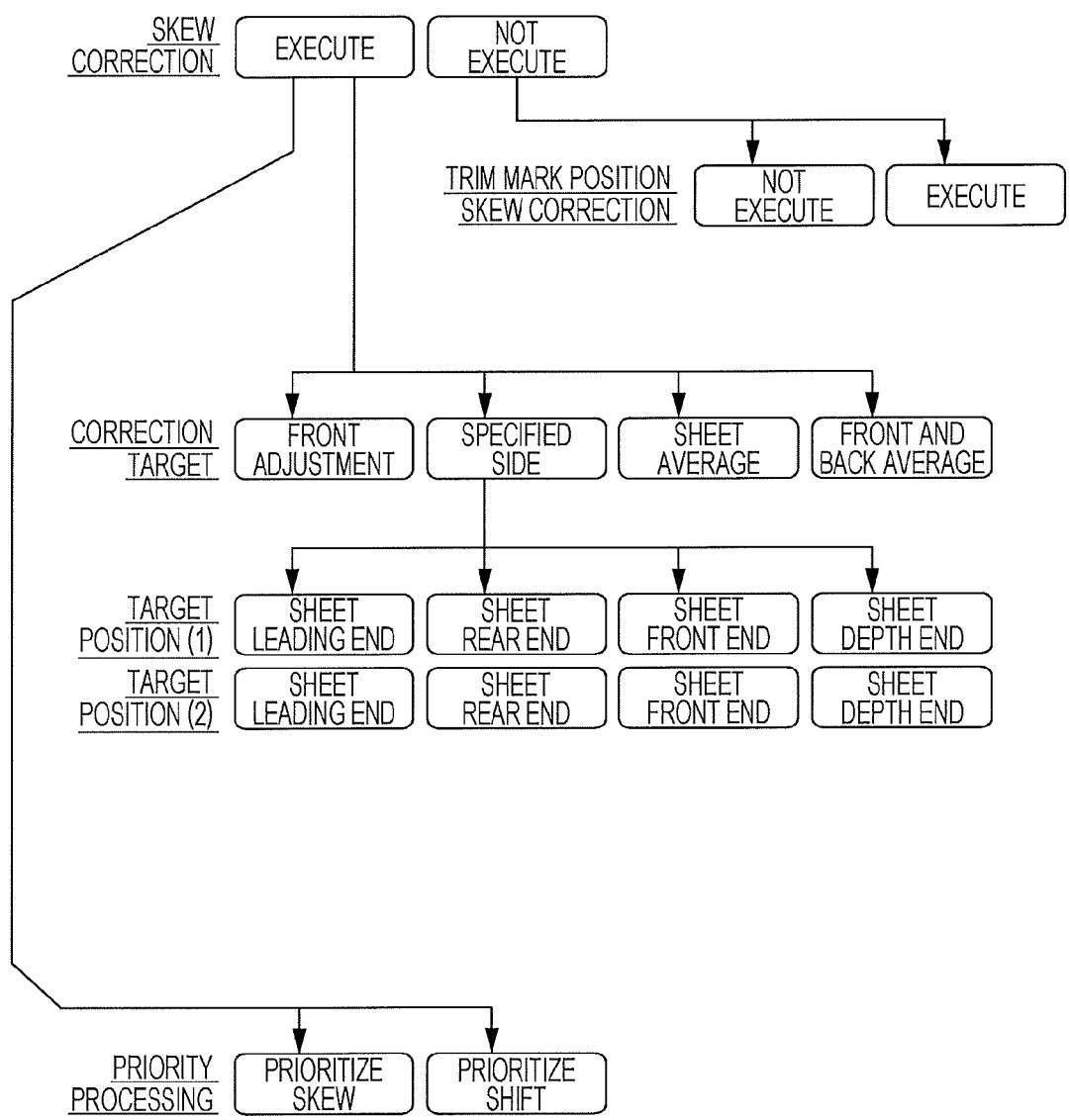
FIG. 12 is an explanatory diagram illustrating an operation state of an embodiment of the present invention.

FIGS. 10 and 11 above illustrate examples of the image processing setting item screen 103G1. The selection order of the selection items is illustrated in FIG. 12 in a dendrogram.

Note that the selection of the image processing setting items is not limited to the user-settable configuration, as illustrated in FIGS. 10 and 11. For example, the control unit 101 may automatically select a correction mode based on additional information of providing the trim marks and the like. Further, in a case where the external form does not have a correct square based on the measurement result of the external form of the printed sheet, the control unit 101 may automatically select predetermined set values for the setting items of the correction target and the items thereunder in the correction mode at the time of the skew correction, or the control unit 101 may display, on the operation display unit 103, display to prompt the user to select a correction mode at the time of the skew correction.

Further, the control unit 101 may automatically switch the selection item, or the user may be able to select the items, according to the sheet size. For example, in a case of a fixed A4 sheet, the sheet is often used as it is without cut, and thus the mode is set to the sheet average mode. In a case of an A3 elongated sheet, cut is supposed and thus the mode is set to the specified side mode. The user may preset the mode in advance for each sheet. In addition, "automatic" setting items may exist, where the user selects part of the items and the control unit 101 automatically determines the rest of the items.

Here, back to description of the flowchart of FIG. 9. The control unit 101 calculates the skew correction margin, the magnification correction margin, and the position correction margin by reference to the image size and the size of the work area (apparatus-specific information of the image forming apparatus 100 such as the image memory of the image data storage unit 130 and the image carrier of the image forming unit 150) (step S106 of FIG. 9). Note that the calculation of the skew correction margin, the magnification correction margin, and the position correction margin will be described in detail below.

The control unit 101 determines whether the skew correction=execution as the image processing setting item set as described above (step S107 of FIG. 9). When it is not the skew correction=execution (NO in step S107 of FIG. 9), the control unit 101 determines whether the tilt of the image is a predetermined threshold or more by reference to a result of the detection (step S102 of FIG. 9) of the distortion of the image (step S108 of FIG. 9). Note that the predetermined threshold is a value determined as a user or factory-set initial value, considering whether the tilt of the image is noticeable.

In use putting a value on print image quality such as a letter grade and a tone, the disadvantage of the image quality deterioration becomes larger than the advantage by the skew correction, in a case where the tilt of the image is small. Therefore, it is desirable not to execute the skew correction.

Meanwhile, in label printing or layout printing mainly including ruled lines and letters, front and back position accuracy is often more important than some image quality deterioration, and in this case, the threshold may be able to be set small, or the user may set the threshold.

Further, a skew threshold switch may be prepared, by which enabling/disabling of the step of determining whether the tilt is the predetermined threshold or more (step S108 of FIG. 9) can be selected. For example, in the use putting a value on the print image quality such as a letter grade and a tone, the skew threshold switch is enabled, and in a case where the tilt of the image is small, the skew correction is not executed. In a case of the label printing or the layout printing mainly including ruled lines and letters, the skew threshold switch is disabled, and the skew correction is set to execution on a constant basis, regardless of the magnification relationship between the skew correction and the threshold.

Figure 13:
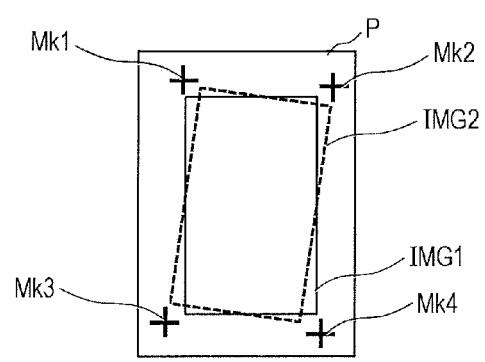
FIG. 13 is an explanatory diagram illustrating a state of printed matter of an embodiment of the present invention.

Here, when the skew correction is set to non-execution (NO in step S107 of FIG. 9), and the tilt of the image is the predetermined threshold or more (YES in step S108 of FIG. 9), a parameter to tilt the trim marks Mk1 to Mk4 as the cut marks in accordance with the tilt of the images (the first surface image IMG1 and the second surface image IMG2), as illustrated in FIG. 13, is determined (step S109 of FIG. 9). In FIG. 13, the trim marks Mk1 to Mk4 are tilted to include the first surface image IMG1 and the second surface image IMG2.

FIG. 9 illustrates a flow of tilting the trim mark positions on a constant basis when the above conditions are satisfied.

However, as illustrated in FIGS. 10, 11, and 12, it may be configured to execute the processing for tilting the trim mark positions only when the skew correction is set to non-execution and the trim mark position skew correction is selected for execution.

Then, following that, the flowchart proceeds to determination of a shift correction parameter and determination of a magnification correction parameter (step S115 of FIG. 9).

Further, here, if the skew correction is set to non-execution (NO in step S107 of FIG. 9), and the tilt of the image is not the predetermined threshold or more (NO in step S108 of FIG. 9), the flowchart proceeds to the determination of a shift correction parameter and the determination of a magnification correction parameter (step S115 of FIG. 9).

Further, when the skew correction is set to execution (YES in step S107 of FIG. 9), and the tilt of the image is not the predetermined threshold or more (NO in step S110 of FIG. 9), the flowchart proceeds to the determination of a shift correction parameter and the determination of a magnification correction parameter (step S115 of FIG. 9), without determining the parameter of the skew correction.

Further, when the skew correction is set to execution (YES in step S107 of FIG. 9), the tilt of the image is the predetermined threshold or more (YES in step S110 of FIG. 9), and the skew correction priority is not set (NO in step S111 of FIG. 9), the skew correction parameter is determined within the range of the skew correction margin (step S114 of FIG. 9), and the shift correction parameter is determined within the range of the shift correction margin and the magnification correction parameter is determined within the range of the magnification correction margin (step S115 of FIG. 9).

Further, when the skew correction is set to execution (YES in step S107 of FIG. 9), the tilt of the image is the predetermined threshold or more (YES in step S110 of FIG. 9), and the skew correction priority is set (YES in step S111 of FIG. 9), whether the skew correction margin necessary to eliminate the tilt of the image by skew correction exists is confirmed (step S112 of FIG. 9).

When the skew correction is set to execution (YES in step S107 of FIG. 9), the tilt of the image is the predetermined threshold or more (YES in step S110 of FIG. 9), and the skew correction priority is set (YES in step S111 of FIG. 9), and when the skew correction margin necessary to eliminate the tilt of the image by skew correction exists (YES in step S112 of FIG. 9), the skew correction parameter is determined within the range of the skew correction margin (step S114 of FIG. 9), and the shift correction parameter is determined within the range of the shift correction margin and the magnification correction parameter is determined within the range of the magnification correction margin (step S115 of FIG. 9).

Meanwhile, when the skew correction is set to execution (YES in step S107 of FIG. 9), the tilt of the image is the predetermined threshold or more (YES in step S110 of FIG. 9), and the skew correction priority is set (YES in step S111 of FIG. 9), and when the skew correction margin necessary to eliminate the tilt of the image by skew correction does not exist (NO in step S112 of FIG. 9), the margin adjustment is performed to secure the necessary skew correction margin (step S113 of FIG. 9). Note that this securing of the skew correction margin will be described in detail below. Then, the skew correction parameter is determined within the range of the secured skew correction margin (step S114 of FIG. 9), and the shift correction parameter is determined within the range of the shift correction margin and the magnification correction parameter is determined within the range of the magnification correction margin (step S115 of FIG. 9).

Then, at a point of time when various parameters for correcting the distortion of the image have been determined, the image processing is executed for the image data in the image processing unit 140 according to the parameters (step S116 of FIG. 9), and print is executed in the image forming unit 150 based on the image data for which the image processing has been performed (step S117 of FIG. 9).

By the above image processing and print, the original image data ((b1) of FIG. 5) is deformed in the image processing to offset the distortion occurring in the image formation ((b1') of FIG. 5), and an original image without the distortion, as illustrated in (b2) and (b3) of FIG. 5 is printed.

Note that the image processing and the print of all pages of images to which the print instruction has been given by the user, are executed by the control of the control unit 101 (steps S116 to S117, YES in step S118, and END of FIG. 9).

Note that the flowchart of FIG. 9 can be applied to simplex printing as it is. Duplex printing can be processed by the flow of FIG. 9 by treating the front and back surfaces as a pair of images.

In that case, the chart output in step S101 is duplex-printed, and the distortion of the image detected in step S102 is detected from each of the front and back surfaces. In that case, obviously, the positional deviation between the front and back surfaces can be detected from the difference in the distortion between the front and back surfaces. The calculation results can be commonly used for the front and back surfaces in steps S103 to S106, and results can be respectively obtained for the front and back surfaces, as needed. Steps S107 and S111 are commonly set for the front and back surfaces. Steps S108 and S110 may just be determined in each of the front and back surfaces, and step S112 is configured to determine NO when the margin of at least one of the front and back surfaces is lacked. The marks in step S109 are cut trim marks, and thus the parameter is generated only for one surface (for example, the front surface), and a parameter not to print the marks is generated for the other surface (for example, the back surface). The margin in step S113 is secured for both of the front and back surfaces, and the various correction parameters in steps S114 and S115 are set to each of the front and back surfaces. In steps S116 and S117, processing as duplex printing is executed, and termination of all print is determined in step S118.

Further, the present flow illustrates an example of outputting the chart print only one time, and executing a normal print output using the correction value calculated based on the measurement result. However, the present invention is not limited to this example. For example, a flow to perform the chart print output again in step S103 or in the subsequent flow, put the output back to the scan in step S101, and repeat the correction can be employed. In this case, the distortion (serving as the deviation amount or the correction amount described above) obtained in step S102 is considered in the chart measurement of the first time, and the processing of step S103 and the subsequent steps is executed.

[Detailed Description in Priority Processing (Prioritizing Skew Correction/Prioritizing Shift Correction)]

Here, a correction operation example in the priority processing (prioritizing skew correction/prioritizing shift correction) will be described with reference to FIGS. 14A to 14C.

Figure 14A:
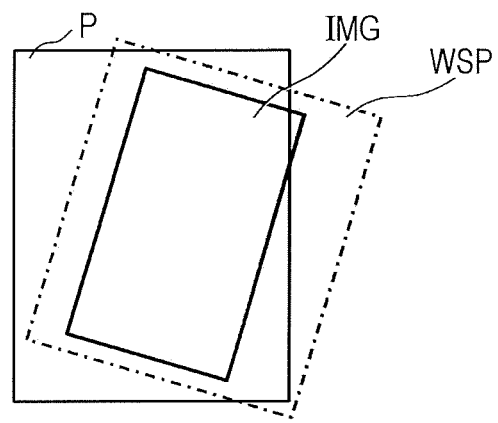
FIGS. 14A to 14C are explanatory diagrams illustrating states of printed matter of an embodiment of the present invention.
Figure 14B:
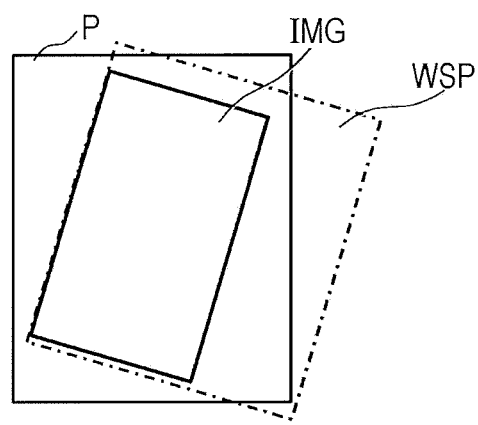
Figure 14C:
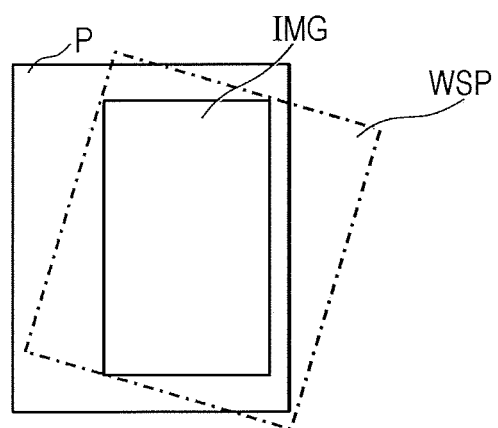

FIGS. 14A to 14C illustrate relationship among a sheet P, an image work space WSP, and the image IMG.

FIG. 14A illustrates a state before correction, and it can be seen that the image IMG protrudes from the sheet P due to the distortion including the tilt. Therefore, if the print is executed in this state, a part of the image IMG is lacked.

Therefore, the image position is adjusted. A range in which an image can be formed is only within the image work space WSP sectioned by the one dot chain line. Therefore, if the image is adjusted to a correct position (without skew in the center) on the sheet P, the image protrudes from the image work space WSP, and lack is caused.

FIG. 14B illustrates a state after correction in a case of prioritizing the shift correction, and illustrates a state in which the image IMG is fit in the range of the sheet P by the shift correction. Note that the image IMG is positioned in an end portion of the image work space WSP due to the shift correction, and thus the direction of the image IMG cannot be adjusted to the direction of the sheet by the skew correction.

FIG. 14C illustrates a state after correction in a case of prioritizing the skew correction, and the margin of the skew correction is secured and the skew correction is executed. Therefore, the image IMG is aligned in the same direction as the sheet P. Note that the margin is preferentially allocated to the skew correction, and thus the image IMG is positioned in the end portion of the image work space WSP. Therefore, the position of the image IMG cannot be adjusted to the center of the sheet by the shift correction.

[Detailed Description about Relationship Between Skew Correction and Correction Target]

Here, relationship between the skew correction and the correction target will be described in detail with a specific example with reference to FIGS. 15A to 15F. Note that as the alternatives of the correction target described in the image processing setting items of FIG. 10, front adjustment/specified side/sheet average/front and back average exist.

Figure 15A:
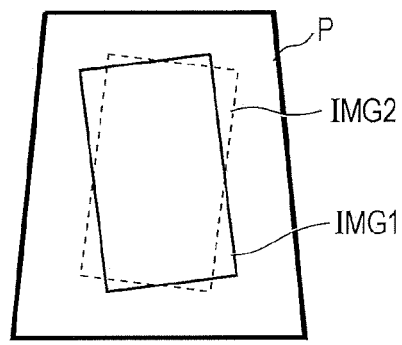
FIGS. 15A to 15F are explanatory diagrams illustrating states of printed matter of an embodiment of the present invention.

FIG. 15A illustrates a state of the first surface image IMG1 and the second surface image IMG2 on the sheet P before correction.

Figure 15B:
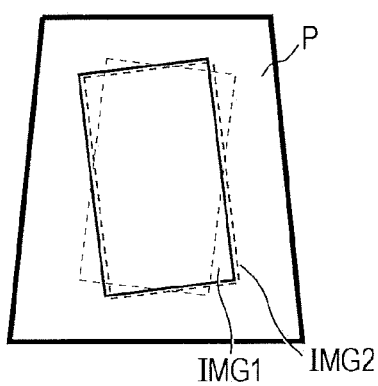

FIG. 15B illustrates a state of the first surface image IMG1 and the second surface image IMG2 on the sheet P after skew correction, in a case where the surface adjustment is selected as the correction target of the skew correction. Note that the front adjustment is a conventionally existing technique. In this case, the second surface image IMG2 is adjusted to the first surface image IMG1, assuming that the first surface image IMG1 is in a correct state. Note that, in this case, the image is printed regardless of the sheet external form. Therefore, this case is sometimes not desirable.

For example, in a case where measurement and adjustment have been correctly performed using a sheet having an external form with an accurate image position on the front surface (the external form has a correct size or is an accurate square); however, following that, actual print work has been performed with a sheet with an inaccurate sheet external form and the front and back positional deviation occurs, and thus the front and back position adjustment of the present embodiment is executed, the image positional deviation associated with the sheet external form occurs on the front surface. The positional relationship between the front and back surfaces favorably accords in the position adjustment to adjust the back surface to the front surface. However, the image position for the sheet cannot be inherently adjusted.

Figure 15C:
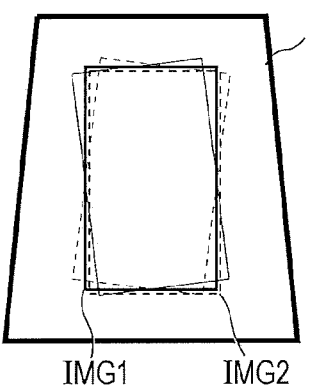

FIG. 15C illustrates a state of the first surface image IMG1 and the second surface image IMG2 on the sheet P after the skew correction, in a case where the front and back average is selected as the correction target of the skew correction. In this case, the first surface image IMG1 and the second surface image IMG2 are adjusted to an intermediate tilt state between the first surface image IMG1 and the second surface image IMG2. Therefore, this case has an advantage of requiring a less skew correction margin on the first and second surfaces.

Figure 15D:
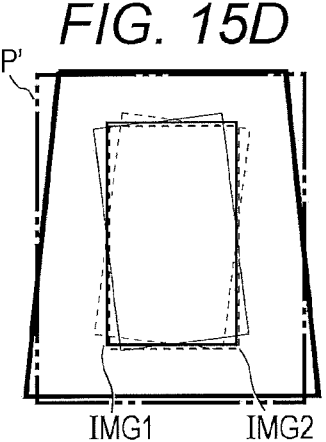

FIG. 15D illustrates a state of the first surface image IMG1 and the second surface image IMG2 on the sheet P after the skew correction, in a case where the sheet average is selected as the correction target of the skew correction. Here, the first surface image IMG1 and the second surface image IMG2 are respectively adjusted to the center of the assumed external form, assuming that the external form of the sheet P is a square although the external form is not square. Therefore, in print not supposing cut, like FIG. 8A, the image position can be adjusted in the sheet external form in a most fit manner, and a favorable print result can be obtained.

Figure 15E:
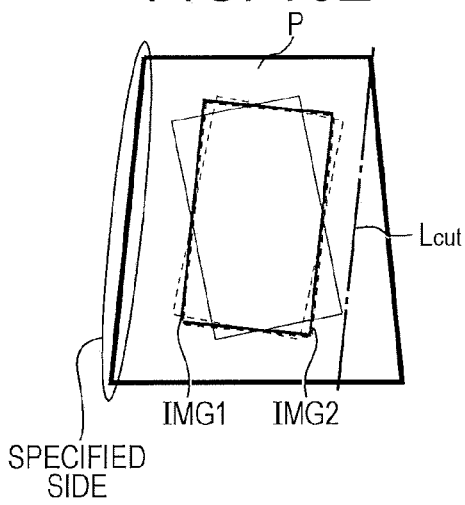

FIG. 15E illustrates a state of the first surface image IMG1 and the second surface image IMG2 on the sheet P after the skew correction, in a case where the specified side is selected as the correction target of the skew correction. In this case, the first surface image IMG1 and the second surface image IMG2 are adjusted such that the tilt with respect to the specified side becomes minimum and the positional relationship between the front and back surfaces accords. Therefore, the position facing the specified side is employed as a cut position Lcut, so that the images are correctly fit to the sheet with a simple operation. That is, the specified side is the reference position regarding the skew correction.

Figure 15F:
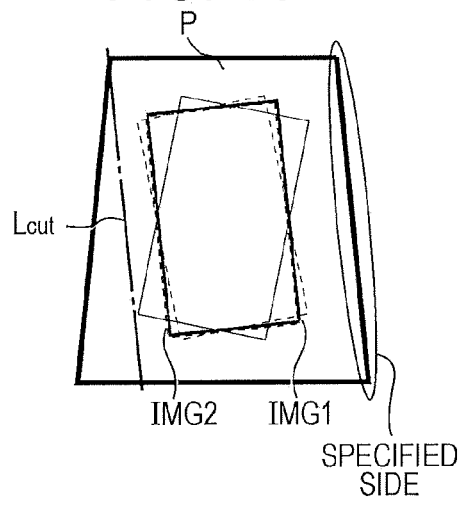

FIG. 15F illustrates a case of the first surface image IMG1 and the second surface image IMG2 on the sheet P after the skew correction, in a case where the specified side is selected as the correction target of the skew correction. In this case, the first surface image IMG1 and the second surface image IMG2 are adjusted such that the tilt with respect to the specified side (reference position) different from FIG. 15E becomes minimum, and the positional relationship between the front and back surfaces accords. Therefore, the position facing the specified side is employed as a cut position Lcut, so that the images are correctly fit in the sheet with a simple operation.

As described above, FIGS. 15E and 15F can correctly adjust the tilt of the image with respect to the specified side of the sheet. Therefore, when the sheet is cut after print, the reference side at the time of cut is set as the reference side, so that adjustment of the image position after cut becomes easy without skew. Further, for example, when processing for binding a paper document with a staple is performed as a post-processing, the tilt of the bound side and the image position is correctly corrected. Therefore, the grade of the bound printed matter is improved, and workability of when a booklet is further cut in post-processing becomes favorable.

[Detailed Description of Margin Calculation]

Hereinafter, calculation of the margin by the control unit 101 will be described using specific numerical values. Note that this calculation obtains the margin for each of the main scanning direction and the sub-scanning direction by the same processing procedure. Therefore, in the description below, no distinction is made between the main scanning direction and the sub-scanning direction.

A sheet size Size_Paper is acquired based on the print instruction. For example, in a case of an A3-size short side, the sheet size is 297 mm.

An image size Size_Image is calculated based on the print instruction. For example, in a case of providing a white border of 3 mm to around the A3-size sheet, in the case of a A3-size short side, the image size is 297−(3*2)=291 mm. Further, in a case of printing an image on the entire sheet without a border, the image size Size_Image becomes 297 mm, which is the same as the sheet size.

A maximum print size Size_Print corresponding to a maximum work area is acquired with reference to the apparatus-specific information of the image forming apparatus 100. This value is determined according to restriction of the image forming apparatus 100, and for example, the maximum print size Size_Print in the main scanning direction according to the sheet and the short side of the image is 310 mm.

A position correction margin Mergin_Shift is acquired with reference to the apparatus-specific information of the image forming apparatus 100. This value is the margin that can absorb the sheet position deviation from an original designed center, the deviation occurring due to how the sheet is accommodated in the sheet tray or an assembly adjustment error of the image forming apparatus 100. If the position adjustment up to ±5 mm is necessary, the margin is 5*2=10 mm.

A magnification correction margin Mergin_Mag is acquired with reference to the apparatus-specific information of the image forming apparatus 100. This value is, for example a margin for correcting expansion and contraction of the sheet at the time of print, and fine magnification deviation of the image forming apparatus itself. For example, in a case of expanding and contracting the image in a range of up to ±2.0%, it is only an expanding direction that requires the margin in the magnification correction. Therefore, only +2.0% direction is considered. In the case of the A3-size short side, 297*0.02=5.94 mm is the necessary magnification correction margin.

Then, a skew correction margin Mergin_Skew is calculated from above.

Simply, Mergin_Skew=Size_Print−Size_Image−(Mergin_Shift+Mergin_Mag). Therefore, in the above example, the skew correction margin Mergin_Skew that can be used for the skew correction is Mergin_Skew=310−291−(10+5.94)=3.06 mm.

In the above calculation, the margin amounts enable correction even if the adjustment amounts become maximum in a direction of consuming the respective margins. However, in reality, the adjustment amounts can be considered as independent correction amounts substantially having no interaction. Therefore, a possibility of occurrence of such a combination is very small.

In such a case, when distribution of the actual correction amounts follows normal distribution, maximum margins may be secured to fall within a range of Mergin_All=Size_Print−Size_Image=310−291=19 mm, where the square sums of the maximum margin amounts are the total margin Mergin_All that can be used for correction.

For example, in the above example, 10*10+5.95*5.95+(Mergin_Skew*Mergin_Skew)≤19*19, and Mergin_Skew=SQRT(19*19−(10*10+5.95*5.95))=15.02 mm can be set.

If a necessary maximum amount of the skew correction amount falls within the above range, desirable correction is executable. However, the necessary maximum amount exceeds the range, the correction amounts of the image position and magnification can be restricted in a case of prioritizing skew, and the skew correction amount can be restricted in a case of prioritizing shift.

Alternatively, the "front and back average" is selected as the correction target, so that the correction margin can be effectively used. Note that, in the above example, measurement is not performed in advance, and the margin amounts are set based on the predicted maximum correction amounts. However, each measurement may be confirmed as to whether the necessary margin is secured based on an actual measurement result.

In this case, Mergin_Skew, Mergin_Shift, and Mergin_Mag are actual measured values, and if simple addition thereof falls within the total margin Mergin_All, the desirable correction is possible. If the simple addition does not fall within the total margin, the correction amounts of the image position and the magnification can be restricted in the case of prioritizing skew, and the skew correction amount can be restricted in the case of prioritizing shift. Alternatively, the "font and back average" is selected as the correction target, so that the correction margin can be effectively used.

[Detailed Description about Readout of Chart]

Figure 16A:
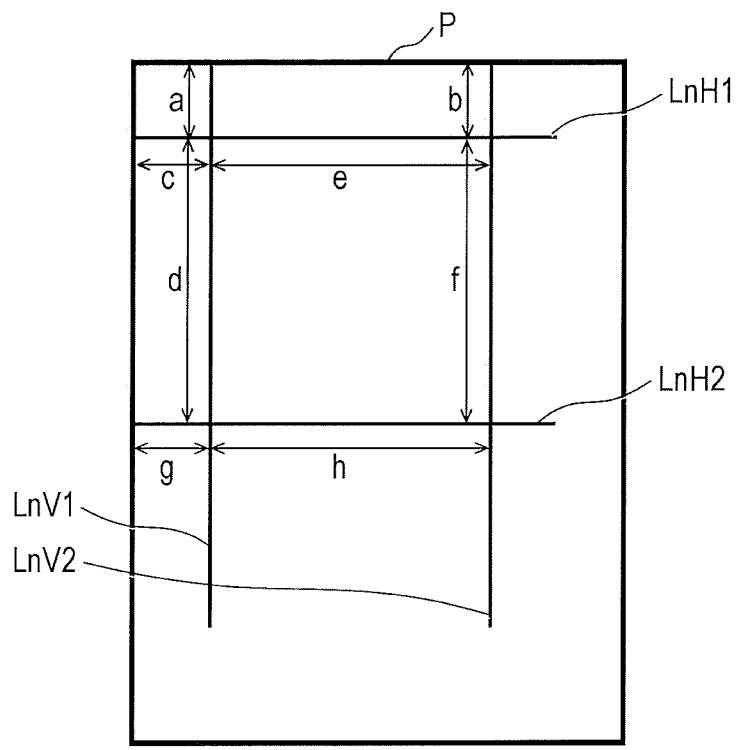
FIGS. 16A and 16B are explanatory diagrams illustrating states of printed matter of an embodiment of the present invention.
Figure 16B:
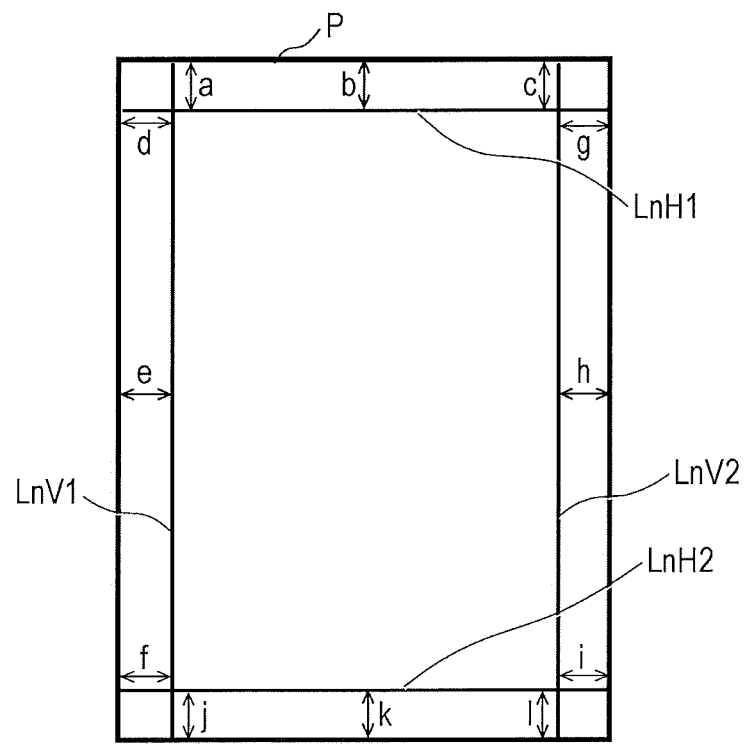

Measurement of the front and back positional deviation of the duplex-printed printed matter is executed by printing the chart, as illustrated in FIGS. 16A and 16B.

First, the positional deviation measurement of the sheet first surface (front surface) is executed with the chart in which the measurement reference lines LnH1, LnH2, LnV1, and LnV2 are printed on the sheet first surface (front surface) of the sheet P, as illustrated in FIG. 16A. Further, only the sheet first surface (front surface) of the chart is printed, and the positional deviation at the time of printing the front surface can be measured. Measuring places are intervals between the sheet end portions and the measurement reference lines and intervals between the plurality of measurement reference lines, and are illustrated by the arrows a to h. Note that the measuring places may be measured using the document reading unit 110 or the like, or the user may measure the places with the eye with a ruler, and input numerical values of the measurement results to the operation display unit 103. With such print of the chart and measurement, basic characteristics of print such as vertical and horizontal magnification at the time of print, an image central position, a right angle characteristic between the sheet conveying direction and the main scanning direction, and conveyance deviation of the reference sheet (the sheet tilt with respect to the position and the conveying direction) are measured.

Further, the front and back position adjustment is executed using the chart illustrated in FIG. 16B. As this pattern, the measurement reference lines LnH1, LnH2, LnV1, and LnV2 are printed on both front and back surfaces of the sheet P. In a case where the measurement reference lines LnH1, LnH2, LnV1, and LnV2 are correctly printed on both front and back surfaces of the sheet P (without distortion), the design of the sheet is such that the print positions of the measurement reference lines on the front and back surfaces of the sheet P are superimposed. In the chart of FIG. 16B, the places of the arrows a to i between the measurement reference lines and the sheet end portions are measured, and a difference in measurement values of the places in front and back corresponding relationship becomes the front and back positional deviation.

The present measurement may also be measured using the document reading unit 110 or the like, or the user may measure the places with the eye with a ruler, and input numerical values of the measurement results to the operation display unit 103.

Note that intersections of the measurement reference lines exist near four corners of the sheet P. The tilt of the image can be obtained from a front and back difference in the positions of the intersections.

That is, for example, the size and position of the back surface image with respect to the front surface can be measured from measurement corresponding to four places including the arrow b, the arrow e, the arrow k, and the arrow h, of FIG. 16B, and the tilt of the image can be obtained from measurement corresponding to eight places including the arrow a, the arrow d, the arrow f, the arrow j, the arrow l, the arrow i, the arrow g, and the arrow c.

The size and position of the back surface image with respect to the front surface is calculated for each of the main scanning direction and the sub-scanning direction based on the measurement results, and the magnification correction parameter and the position adjustment parameter are calculated for each direction. These magnification correction parameter and position adjustment parameter are the adjustment values at the time of printing the back surface.

Further, the tilt of the back surface image with respect to the front surface is measured based on the measurement results of FIG. 16B, and the skew correction parameter is calculated (in a case of executing correction in FIGS. 15B and 15C). Alternatively, the tilt between each front and back measurement reference line and each parallel sheet side is measured, and the skew correction parameter is calculated (in a case of executing correction in FIGS. 15D, 15E, and 15F). The tilt is adjusted using the skew correction parameter.

In a case of adjusting the tilt, the image is tilted around its fulcrum position (a place where the image position is unchanged by the adjustment). That is, the image positions in places except the fulcrum position are deviated from before the correction. Further, the image position after the skew correction differs depending on where the fulcrum position is positioned. For example, in a case where setting of the skew adjustment is changed from "execution" to "non-execution", as needed, the position adjustment needs to be performed again at the time of non-execution of the skew correction so that the fulcrum position in the skew correction at the time of execution of the skew correction can be maintained. Further, in a case where the setting of the skew adjustment is changed from "non-execution" to "execution", the position adjustment similarly needs to be performed again.

Therefore, it is desirable to cause the fulcrum position of the skew correction and measurement positions of the position adjustment to accord with each other.

In doing so, the favorable image position can be maintained even if the magnification correction parameter and the position adjustment parameter are not changed, in the case where the setting of the skew adjustment is changed between "non-execution" and "execution", as needed.

Here, the measurement positions of the position measurement correspond to the positions of the arrow b, the arrow e, the arrow k, the arrow h, as illustrated in FIG. 16B, in a case of measuring the above four places. In a case of measuring the places illustrated by the arrows a to h of FIG. 16A, the position of the measurement reference line LnH1 in the up and down direction is measured based on an average value of the measurement results of the arrows a and b, and the measurement position of that case is an average position of the arrows a and b. That is, a place corresponding to a middle point of a line segment illustrated by the arrow e is the measurement position of the position measurement. Similarly, middle points of a line segment illustrated by the arrow d, a line segment illustrated by the arrow h, and a line segment illustrated by the arrow f are the measurement positions of the position measurement.

As an example, between a case of the position adjustment in which the four places including the arrow b, the arrow e, the arrow k, and the arrow h of FIG. 16B are measured, and a case of the position adjustment in which the places illustrated by the arrows a to h of FIG. 16A are measured, the measurement positions of the position measurement are different. Therefore, in a case of executing the skew adjustment in FIG. 16B, the deviation may be caused in the measurement position. In such a case, the fulcrum position of the skew correction and the measurement positions of the position adjustment can accord with each other by changing the chart design of FIG. 16A to accord with the four places of the arrow b, the arrow e, the arrow k, and the arrow h of FIG. 16B, or by obtaining measurement values corresponding to the places illustrated by the arrows a to h by interpolation from the measurement values corresponding to the eight places including the arrow a, the arrow d, the arrow f, the arrow j, the arrow l, the arrow i, the arrow g, and the arrow c, in the position adjustment of FIG. 16B to cause the measurement positions of the position measurement to accord with FIG. 16A.

In a case where causing the fulcrum position of the skew correction and the measurement positions of the position adjustment to accord with each other is difficult for some reasons, it is desirable to transfer to an adjustment mode that detects the case where the setting of the skew adjustment is changed from "execution" to "non-execution", and automatically executes the image position adjustment again, or to display a message to prompt the user to perform adjustment again.

In a case where the magnification correction parameter, the position adjustment parameter, and the skew correction parameter are calculated and applied, if the skew correction parameter is set to OFF for some reasons, the image is skewed around the fulcrum position. In this case, if the average position of the image is caused not to deviate from the sheet center, the user can easily set ON/OFF to the skew correction parameter, and for example, in an image occupied with flat half tone or uniform texture in which the image quality deterioration due to the skew correction is noticeable, the skew correction can be easily set to off, and convenience is improved. As can be seen from the above description, the tilt amount is changed not only on the print back surface but also the adjustment amount on the front surface depending on the mode.

[Detailed Description of Cut Marks and Cut Place Identification]

Figure 17A:
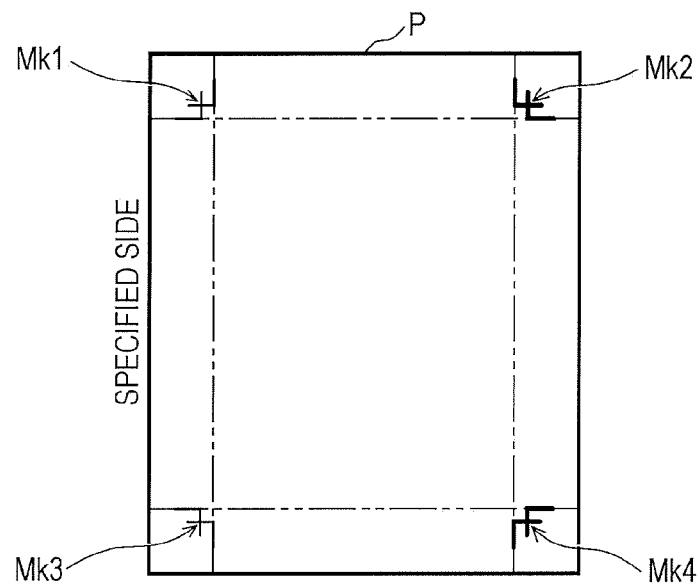
FIGS. 17A to 17C are explanatory diagrams illustrating states of printed matter of an embodiment of the present invention.
Figure 17B:
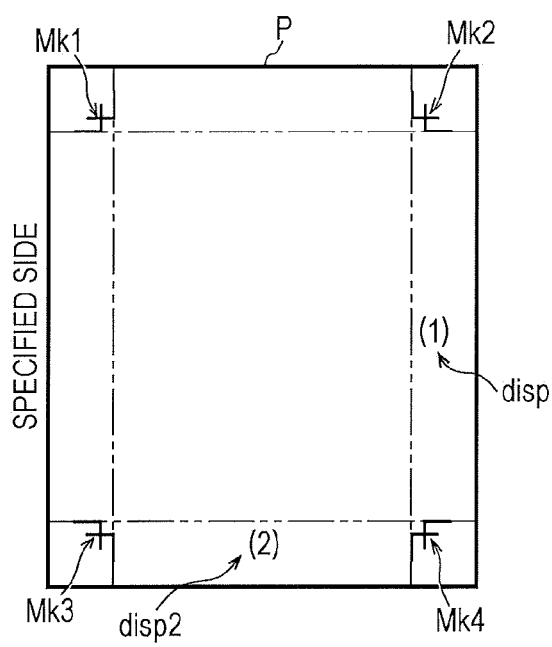
Figure 17C:
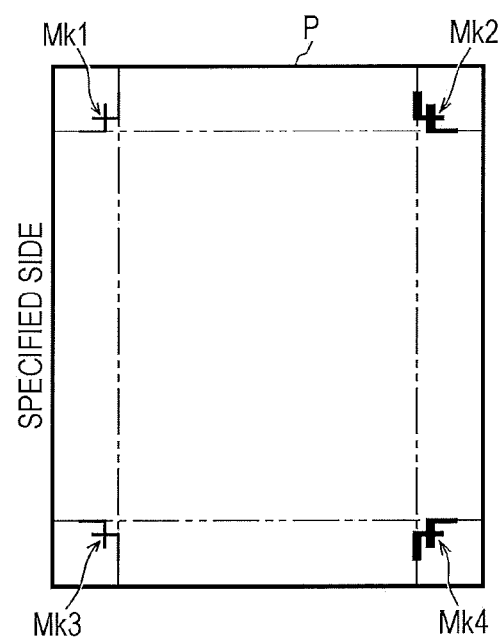

FIGS. 17A to 17C illustrate examples of cases where the cut marks Mk1 to Mk 4 are provided in forming an image (not illustrated) on the sheet P. Here, the cut mark is configured from a combination of two L shapes, instead of a cross shape. With such a shape, the sheet portion that is cut and remains and the cut marks are not in contact with each other.

In FIG. 17A, the side in the left end portion on the drawing is the specified side (reference position) that is the correction target of the skew correction. Here, cut is executed in the position of the one dot chain line surrounded by the cut marks Mk1 to Mk4. In this case, the one dot chain line in the right end (the cut position sandwiched by the cut marks Mk2 and Mk4), which is a position facing the specified side, is the cut position to be cut first. Therefore, the cut marks Mk2 and Mk4 that sandwich the cut position are configured from a thicker line than the other cut marks Mk1 and Mk3 so that the cut position becomes clear. Note that other methods than the thicker line may be employed as long as the marks are identifiable.

In FIG. 17B, the side in the left end portion on the drawing is the specified side (reference position) that is the correction target of the skew correction. In this case, the one dot chain line in the right end (the side sandwiched by the cut marks Mk2 and Mk4), which is a position facing the specified side, is a first cut position to be cut first. Therefore, cut order display dsp1 ("(1)" in FIG. 17B) is displayed in an area in a position near the side of the cut position, the area being cut and discarded, so that the first cut position becomes clear. Further, cut order display dsp2 ("(2)" in FIG. 17B) is displayed in an area in a position near the side of the cut position, the area being cut and discarded, so that the second cut position becomes clear.

In FIG. 17C, the side in the left end portion on the drawing is the specified side (reference position) that is the correction target of the skew correction. In this case, the one dot chain line in the right end (the side sandwiched by the cut marks Mk2 and Mk4), which is a position facing the specified side, is the first cut position to be cut first.

Therefore, a portion parallel to the first cut position, of the cut marks Mk2 and Mk4 that sandwich the cut position, is configured from the thickest line so that the first cut position (the cut position sandwiched by the cut marks Mk2 and Mk4) becomes clear. Further, a portion parallel to the second cut position, of the cut marks Mk3 and Mk4 that sandwich the cut position, is configured from the next thickest line so that the second cut position (the cut position sandwiched by the cut marks Mk3 and Mk4) becomes clear. Then, the lines except the cut marks are configured from a narrow line or a middle line. That is, the lines of the cut marks are configured from three stages of thickness so that the first cut position, the second cut position, and other cut positions are clearly illustrated. Note that other methods than the thickness of the lines may be employed as long as the marks are identifiable.

As described above, any of the cut marks Mk1 to Mk4 can protrude outside the sheet within an identifiable range as the cut mark in order to secure a sufficient skew correction margin in the case of prioritizing skew.

Note that, in the above description, as the structure of a cut portion (cut apparatus), a case of cutting a side facing a side butting against a butting tool has been described. However, the present embodiment is not limited to this example, and a cut unit configured to have a structure in which a side to be cut is brought to butt against the butting tool can also be used. In this case, the marks are set such that the specified side is cut first, instead of the side facing the specified side. Further, in FIGS. 15E and 15F, the cut position Lcut is positioned to the specified side. That is, the marks should be set according to the relationship between the butting side of the cut unit and the cutting side, and may be fixed to either one of them in advance or may be configured to be specified in the operation display unit 103 in a switchable manner.

Another Embodiment (1)

In the case of FIG. 8A, the print image accords with the sheet size, but a predetermined amount of the four sides of the sheet is a white image so as not to be substantially printed. In such a case, even if a white edge portion thereof protrudes from a drawable area, a substantial image lack does not occur. The size of the white edge may be acquired and an equivalent portion may be used as the position adjustment margin, or the image processing may be configured to extract a substantial white background from the image information and allow the image to protrude from the drawable area up to the range of the white background.

Another Embodiment (2)

The above description of the embodiment of the image forming apparatus 100 can be changed as follows.

In an image forming system including a plurality of image forming apparatuses 100-1 to 100-$n$, as illustrated in FIG. 3, control units of the image forming apparatuses 100-1 to 100-$n$, which have received a read result of an image reading apparatus 200, perform the above control.

In an image forming system including a plurality of image forming apparatuses 100-1 to 100-$n$, as illustrated in FIG. 4, an image processing control apparatus 300, which has received a read result of an image reading apparatus 200, performs the above control. Then, the image processing control apparatus 300 notifies a correction parameter to the image forming apparatuses 100-1 to 100-$n$.

Further, in the image forming system, as described in FIG. 4, it is also desirable to calculate a correction parameter to make characteristics of the image forming apparatuses 100-1 to 100-$n$ uniform, and to make skew correction ON/OFF setting uniform.

Another Embodiment (3)

In the above description, as the structure of the cutting unit, a case of cutting the side facing one side butting against the butting tool has been described. However, an embodiment is not limited thereto. That is, a cutting unit having a structure in which a side to be cut is brought to butt against a butting tool can be used. In this case, predetermined one of sides, where the marks are generated, differs depending on a specification of the cutting unit to be used for work. Therefore, the side may be fixed to either one of them in advance, or it may be configured to specify the side by the operation display unit 103 in a switchable manner.

Another Embodiment (4)

The present embodiment is effective regardless of a sheet size. Especially, in a case of a non-fixed size sheet, which is made by a user who purchases a large sheet and appropriately cuts the sheet, right-angle characteristics are not often maintained with sufficient accuracy. In such a case, the present embodiment is especially effective. That is, the above embodiment is effective for both of a fixed-size sheet and a non-fixed size sheet. Especially, the embodiment effectively functions for the non-fixed size sheet. Further, even for the fixed-size sheet, the embodiment effectively functions in a case where some errors or variations occur in the shape.

Effects Obtained by Embodiments (1) As described in the above embodiments, in a case of executing the skew correction to deform the image in advance to offset the distortion to be caused in the image to be formed on the sheet in forming the image on both surfaces of the sheet, specification of one side, two sides, or the external form of the sheet is received as the reference position of the image processing for the image to be formed on both surfaces of the sheet, and the image processing including the skew correction is executed based on the specification. As a result, the correction target in the skew correction can be appropriately set, corresponding to various types of distortion occurring in the image formation, and the distortion of the printed matter is eliminated by the appropriate skew correction. The present embodiment is effective regardless of a sheet size. Especially, in a case of a non-fixed size sheet, which is made by a user who purchases a large sheet and appropriately cuts the sheet, the right-angle characteristics are not often maintained with sufficient accuracy. In such a case, the present embodiment is especially effective.

(2) In the above (1), the image processing is executed to generate the marks that can identify existence or non-existence of the specification. As a result, post-processing such as cutting can be executed within/outside the range of the image, corresponding to the reference position of the specified image.

(3) In the above (1) and (2), in a case where the specification is the one side or the two sides of the sheet, the image processing is executed to generate the marks that can identify the existence or non-existence of the specification and the cut position, in predetermined one of the cut position facing the specification, and the cut position of the specification. As a result, the post-processing such as cutting can be executed within/outside the range of the image, in the side corresponding to the reference position of the specified image.

(4) In the above (1) and (2), in a case where the specification is the two sides of the sheet, and first specification and second specification exist in priority order as the reference position, the image processing is executed to generate the marks that can identify a first cut position corresponding to the first specification, in predetermined one of the position facing the first specification and the cut position of the first specification, and the image processing is executed to generate the marks that can identify a second cut position corresponding to the second specification, in predetermined one of the position facing the second specification and the cut position of the second specification. As a result, the post-processing such as cutting can be reliably executed without/outside the range of the image, corresponding to the specified order, in the side corresponding to the reference position of the specified image.

(5) In the above (1) and (2), in a case where the specification is the external form, the external form is approximated to a square, and the skew correction for the sheet first surface is executed in accordance with the square. As a result, even if the external form of the sheet is ununiform in the up and down or the right and left direction, the images can be formed on almost near the center of the sheet.

(6) In a case of executing the skew correction to deform the image in advance to offset the distortion to be caused in the image to be formed on the sheet in forming the image on both surfaces of the sheet, when execution and non-execution of the skew correction are selectable, and the non-execution of the skew correction is selected, the image processing is executed not to execute the skew correction for a first image formed on the first surface of the sheet and a second image formed on the second surface of the sheet, and to execute the skew correction for the marks indicating the cut position to include the first image and the second image. As a result, even when the external form of the sheet is ununiform in the up and down or the right and left direction, and the skew correction is not executed for the image, the images can be formed on almost near the center of the sheet.

(7) In a case of executing the skew correction to deform the image in advance to offset the distortion to be caused in the image to be formed on the sheet in forming the image on both surfaces of the sheet, when execution and non-execution of the skew correction are selectable, and the non-execution of the skew correction is selected, the image processing is executed not to execute the skew correction for the first image formed on the first surface of the sheet and the second image formed on the second surface of the sheet, and to perform the position adjustment for at least one of the first image and the second image such that the fulcrum position of the first image and the fulcrum position of the second image becomes equal. As a result, the position adjustment of the front and back images regarding skew becomes possible without generating the image quality deterioration due to the skew correction.

(8) In the above (7), the image processing by the position adjustment is executed not to influence the positional deviation to be corrected by correction other than the skew correction, among types of the distortion, for the tilt to be corrected by the skew correction, among types of the distortion. As a result, the position adjustment of the front and back images regarding skew becomes possible without generating the image quality deterioration due to the skew correction and without providing an influence on the other correction.

(9) In the above (7), the position adjustment is executed or the position adjustment is performed again at the time of non-execution of the skew correction so that the fulcrum positions in the skew correction at the time of execution of the skew correction is maintained. As a result, the position adjustment of the front and back images regarding skew becomes possible without generating the image quality deterioration due to the skew correction and without providing an influence on the other correction.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing apparatus comprising:
an image processing unit configured to execute, in forming an image on both surfaces of a sheet, image processing including skew correction to deform the image in advance to offset distortion to be caused in the image to be formed on the sheet, wherein,
the image processing unit receives specification of the sheet as a reference position of the image processing for the image to be formed on the both surfaces of the sheet, and executes the image processing including the skew correction deforming the image to offset the distortion based on the specification before forming the image on the sheet;
wherein the specification of the sheet as the reference position is defined by any of one side, two sides, and an external form of the sheet.

2. The image processing apparatus according to claim 1, wherein
the image processing unit executes the image processing to generate a mark capable of identifying existence or non-existence of the specification.

3. The image processing apparatus according to claim 1, wherein,
in a case where the specification is the one side or the two sides of the sheet,
the image processing unit executes the image processing to generate, on predetermined one of a cut position facing the specification or a cut position of the specification, a mark capable of identifying the existence or non-existence of the specification and the cut position.

4. The image processing apparatus according to claim 1, wherein,
in a case where the specification is the two sides of the sheet, and first specification and second specification exist in priority order as the reference position,
the image processing unit executes the image processing to generate, on predetermined one of a position facing the first specification or a cut position of the first specification, a mark capable of identifying a first cut position corresponding to the first specification, and executes the image processing to generate, on predetermined one of a position facing the second specification or a cut position of the second specification, a mark capable of identifying a second cut position corresponding to the second specification.

5. The image processing apparatus according to claim 1, wherein,
in a case where the specification is the external form, the image processing unit approximates the external form to a square, and executes the skew correction for a first surface of the sheet in accordance with the square.

6. An image processing apparatus comprising:
an image processing unit configured to execute, in forming an image on both surfaces of a sheet, image processing including skew correction to deform the image in advance to offset distortion to be caused in the image to be formed on the sheet, the skew correction deforming the image to offset the distortion before forming the image on the sheet, wherein,
in a case where execution and non-execution of the skew correction are selectable, and the non-execution of the skew correction is selected,
the image processing unit does not execute the skew correction for a first image to be formed on a first surface of the sheet and a second image to be formed on a second surface of the sheet, and
the image processing unit executes the image processing to execute the skew correction for a mark indicating a cut position to include the first image and the second image.

7. An image processing apparatus comprising:
an image processing unit configured to execute, in forming an image on both surfaces of a sheet, image processing including skew correction to deform the image in advance to offset distortion to be caused in the image to be formed on the sheet, the skew correction deforming the image to offset the distortion before forming the image on the sheet, wherein,
in a case where execution and non-execution of the skew correction are selectable, and the non-execution of the skew correction is selected,
the image processing unit does not execute the skew correction for a first image to be formed on a first surface of the sheet and a second image to be formed on a second surface of the sheet, and
the image processing unit executes the image processing to perform position adjustment for at least one of the first image and the second image such that a fulcrum position of the first image and a fulcrum position of the second image become equal.

8. The image processing apparatus according to claim 7, wherein
the image processing unit executes, for tilt to be corrected by the skew correction among types of the distortion, the image processing by the position adjustment not to provide an influence on a positional deviation to be corrected by correction other than the skew correction among types of the distortion.

9. The image processing apparatus according to claim 7, wherein
the image processing unit executes the position adjustment at a time of non-execution of the skew correction such that a fulcrum position in the skew correction at a time of execution of the skew correction is maintained.

10. A non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, the skew correction deforming the image to offset the distortion before forming the image on the sheetbf,
the program for receiving specification of any of one side, two sides, and an external form of the sheet, as a reference position of the image processing for the image to be formed on the both surfaces of the sheet, and executing the image processing including the skew correction based on the specification.

11. A non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, the skew correction deforming the image to offset the distortion before forming the image on the sheet,
in a case where execution and non-execution of the skew correction are selectable, and the non-execution of the skew correction is selected,
the program for not executing the skew correction for a first image to be formed on a first surface of the sheet and a second image to be formed on a second surface of the sheet, and
executing the image processing to execute the skew correction for a mark indicating a cut position to include the first image and the second image.

12. A non-transitory recording medium storing a computer readable program in an image processing apparatus including an image processing unit configured to execute, in forming an image on both surfaces of a sheet, image processing including skew correction to deform the image in advance to offset distortion to be caused in the image to be formed on the sheet, the skew correction deforming the image to offset the distortion before forming the image on the sheet,
in a case where execution and non-execution of the skew correction are selectable, and the non-execution of the skew correction is selected,
the program for not executing the skew correction for a first image to be formed on a first surface of the sheet and a second image to be formed on a second surface of the sheet, and executing the image processing to perform position adjustment for at least one of the first image and the second image such that a fulcrum position of the first image and a fulcrum position of the second image become equal.

* * * * *